Nov. 16, 1965  G. HOLZER ETAL  3,218,439
VOTE TALLYING MACHINE
Filed Aug. 7, 1964
10 Sheets-Sheet 1

INVENTOR.
GEROLD HOLZER
NORMAN WALKER
BY  HARRY WILCOCK

Nov. 16, 1965        G. HOLZER ETAL        3,218,439
VOTE TALLYING MACHINE
Filed Aug. 7, 1964                          10 Sheets-Sheet 2

INVENTOR.
GEROLD HOLZER
NORMAN WALKER
BY HARRY WILCOCK

Golove + Kleinberg

INVENTOR.
GEROLD HOLZER
NORMAN WALKER
HARRY WILCOCK
BY
*Golove + Klenberg*

Nov. 16, 1965  G. HOLZER ETAL  3,218,439
VOTE TALLYING MACHINE
Filed Aug. 7, 1964  10 Sheets-Sheet 7

INVENTOR.
GEROLD HOLZER
NORMAN WALKER
HARRY WILCOCK
BY
Golove + Klemberg

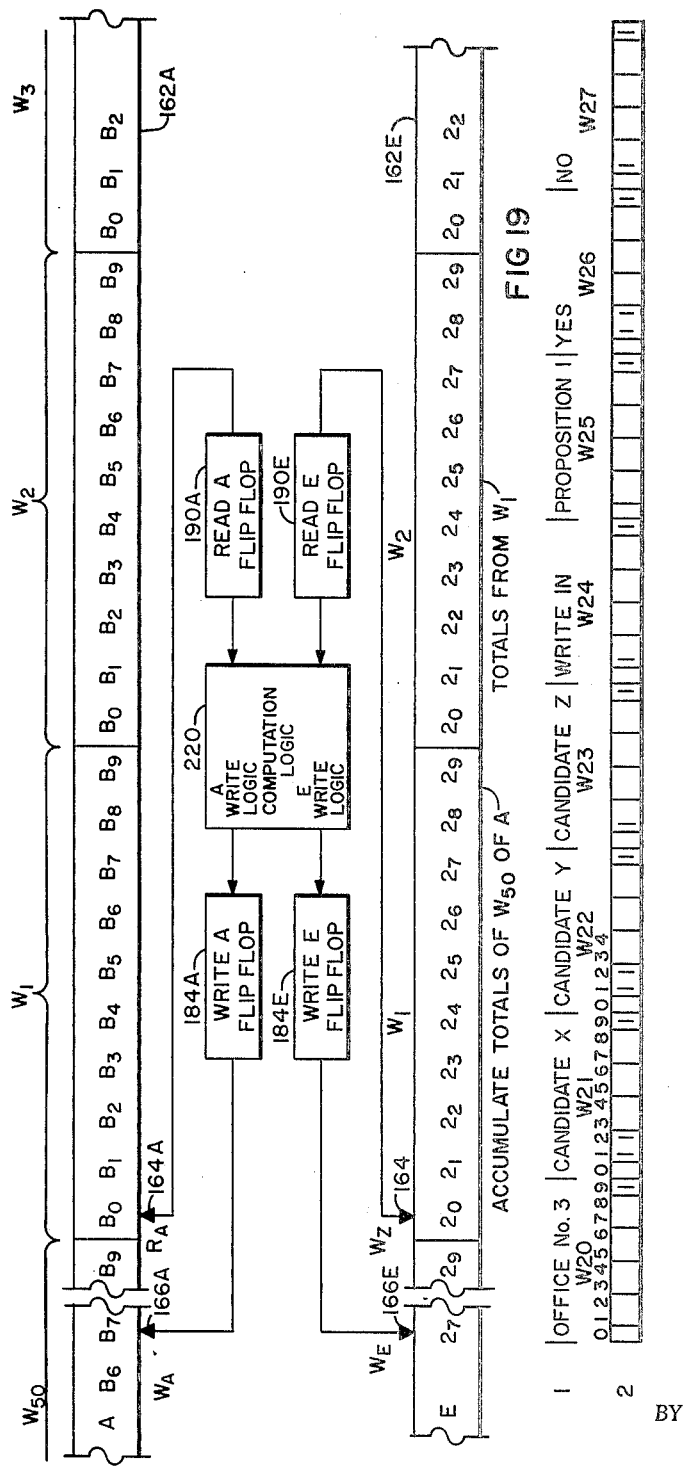

Nov. 16, 1965  G. HOLZER ETAL  3,218,439
VOTE TALLYING MACHINE
Filed Aug. 7, 1964  10 Sheets-Sheet 10

INVENTOR.
GEROLD HOLZER
NORMAN WALKER
HARRY WILCOCK
BY
Golove + Kleinberg

United States Patent Office

3,218,439
Patented Nov. 16, 1965

3,218,439
VOTE TALLYING MACHINE
Gerold Holzer, Norman Walker, and Harry Wilcock, Orange County, Calif., assignors to Votronics, Inc., San Diego, Calif.
Filed Aug. 7, 1964, Ser. No. 388,159
23 Claims. (Cl. 235—61.7)

This invention relates to an automatic counting machine and more particularly to a machine which scans a paper election ballot and automatically tallies every mark on such paper ballot representing a vote properly cast, during a single pass of the ballot through the machine.

Many voting districts in the United States of America and particularly in the State of California, employ paper ballots for use by voters at elections which include many possible voting combinations. These ballots are intended to be hand-marked by the individual voter in a polling both. Following the close of the polls, the laborious, expensive and time-consuming task of counting the votes for each of the candidates for the many offices, and propositions submitted to the voters then commences. In addition to being expensive and time consuming, the hand-counting of votes is subject not only to normal human error, but also to abnormal error introduced by the fatigue and strain of counting late into the night.

While mechanical and electro-mechanical voting machines have long been available as replacement for the paper ballots, for recording the preferences of the individual votes, such machines are generally very expensive and often do not possess the flexibility of a paper ballot.

The machine of the present invention eliminates all of these problems. Due to its speed, compactness, ease of use and relatively low cost, it permits many polling places to employ a relatively few number of workers and machines to count all of the votes following the closing of the polls. The voter need not be concerned with changing his method of voting, the paper ballot may still be marked in the usual manner. It is only after the voters have voted that the machine of the present invention is brought into play.

A preferred embodiment of the present invention is a self-contained unit, which "reads" a conventional paper ballot at a rapid rate and accumulates and stores the total vote for each candidate and for each of the other measures voted upon the electorate. At a later time the individual totals, stored in the machine can be displayed or printed out in a permanent record.

While prior art machines which read and count paper ballots, do exist, as for example the machine described in the patent to Fechter et al., Patent No. 2,940,663, issued June 14, 1960, such machines have been very large and therefore relatively immobile and expensive to purchase, operate and maintain. But most unfortunately, such prior art machines usually require the services of a professional programmer before they can be used, which can only add to the cost and complexity of their use. The programming for these prior art machines is generally carried out in a manner typical of most digital computers; that is the program for the reading of a given set of ballots, must be introduced into the machine by a patch board, by the setting of potentiometers or the manual setting and adjusting of individual reading elements, and the like.

The machine of the present invention on the other hand, may be programmed very quickly and simply by the operator of the machine, who need not be a professional programmer and in fact may be a relatively untrained and unskilled poll worker. Programming is accomplished automatically, photo-electrically; by merely feeding the so-called "programming sheets" through the machine in the exact same manner that the paper ballots to be counted would be fed into the machine.

This novel feature of the present invention need not necessarily be limited to use in a vote counting machine. The same mode of operational programming may be employed in any other computers where it is desired to program the computer directly from a printed or written form.

The key to the simplicity of operation, compactness, and ease of use of the present invention resides in the utilization of high speed digital computer techniques in conjunction with modern web transport mechanisms and display devices. Prior art vote counting or ballot tabulating machines such as are described in the patent to Keith, Patent No. 2,750,108, or Fechter et al., Patent No. 2,940,663, provided a separate sensing unit and associated electro-mechanical counter for each possible voting position on the ballot. Each ballot had to be stopped, in a proper location and each voting position was "read," simultaneously.

According to the present invention, a single scanning element is provided for each of the columns of a ballot, and each such scanning element is shared, in common with some fifty electronic counters. Each of these counters consists of several magnetizable spots on a rotatable magnetic drum which are "written into" and "read from" by electronic circuits which are connected to the scanning elements. Other electronic counters are provided to keep track of the "address," or relative location of each of the counters stored in the memory. Since each of the stored counters has a unique "address," or relative location of each of the counters stored in the memory, information can be entered into the counters or extracted from them for display purposes, virtually at will.

Timing marks are printed in the margin of the ballot to synchronize the scanning operation and are counted in a set of address counters, the count of which is continuously compared to that of another set of address counters connected to count timing pulses from the serial memory. Therefore, any voting location on a ballot can be uniquely corresponded to a counter in the memory. The presence or absence of a vote mark in each location can then be properly entered into the stored counter when the "addresses" of both counters coincide.

When all of the ballots have been processed, a novel, electromechanical address generator is used to select a particular stored counter for the display of its contents. The selector mechanism includes a sliding bar having a window therein which is positioned over a sample or replica ballot placed in a suitable location on the machine. Associated with this sliding indicator is a form of position to digital encoder which, through the use of a binary-coded track and a plurality of snap action switches, generates a unique binary code combination corresponding to each possible location on the ballot. This binary count is applied directly to the addressing counter in place of the timing mark input and presets the counter to an "address" corresponding to the selected candidate location. The contents of this counter are compared to the contents of the memory address counter, and when the counts are identical the correct stored counter can be called upon to display its contents.

The combination, therefore, of a simple, reliable ballot transport mechanism, a limited number of scanning elements and electronic circuits enabling these limited number of scanning elements to be time shared by a multiplicity of individual stored counters, enables the present invention to provide a universal counter of widespread applicability that is ideally suited for the tallying of votes on ballots. Additional features take advantage of legally imposed voting procedures, such as the removal, by an election official, of a corner of each ballot before it is placed in the ballot box, to provide a positive method of assuring that the ballots are fed properly into the machine.

To simplify the operation of the machine and to avoid confusing non-technically trained precinct workers, the machine of the present invention has been designed so that after the machine has been programmed for the ballots of a particular precinct and all of the ballots have been processed, the accumulated totals for each candidate or proposition can be displayed as many times as are necessary for the polling place to prepare its written report.

When the totals are no longer necessary, and the machine is to be used for the ballots of a new precinct or, for example, in the case of a primary election, the ballots of a second political party, the machine must be physically disabled, that is, the power interrupted, before reprogramming can take place. The temporary interruption of power returns the machine to its "warm-up" condition, at which time all information recorded in the memory is erased.

The procedure for programming for a new ballot format is identical to that described above. Furthermore, the act of turning off the machine, momentarily, is an event of sufficient significance, so that all precinct workers assigned to the polling place can satisfy themselves that totals from an earlier tabulation will not be carried into a later tabulation.

In a preferred embodiment, the vote counter of the present invention is adjusted to scan the particular column arrangement for the ballots of each election and is connected to a conventional 110 volt A.C. outlet. Upon receipt of ballots from a precinct, the ballots are compared with Programming Sheets and the Read-Out Sheet for the precinct to insure that all are correct. The precinct number and political party must be identical on the ballots, Programming Sheets, and the Read-Out Sheet.

The Read-Out Sheet is placed in position by sliding it under a plastic cover which is located on top of the machine, and is adjusted so that the bottom of the opening of a slide bar reader, when positioned in the first office location, shows the top of the first black timing mark located on the left side of the Read-Out Sheet. Aligning pins may be provided to aid in positioning and to minimize slippage. The slide bar can be positioned through several locations to make sure that the read-out bar correctly frames the names of the candidates throughout the length of the ballot.

A control switch is initially placed in the "Program" position and the unit is ready to be turned on placing the "Power" switch in the "ON" position. After a delay of approximately ten seconds, a green "READY" light will come on and a light located to the left of the numerical display will appear under a legend of "Feed Program Sheet Number 1." Six lights are provided, two for each of the Programming Sheets that must be fed.

The first Programming Sheet Number 1 is fed into the feed slot, with the top of the ballot first into the unit and all printing visible to the operator. After the first Programming Sheet Number 1 has been fed, the second light under "Feed Program Sheet Number 1." will be illuminated to either feed Programming Sheet Number 1 into the unit a second time or use a second Programming Sheet Number 1 which has been independently prepared.

After the two processings of Programming Sheet Number 1, the program light will advance to "Feed Programming Sheet Number 2." Programming Sheet Number 2 is then fed through the machine. A second number 2 programming sheet must be fed and, the instruction will step to "Feed Programming Sheet Number 3," which are then fed into the machine. A total of six scannings have been completed after which all of the programming lights should be out.

The control switch, which is set on "Program" is next turned to the "Read" position and a light (on the right of the numerical read-out) will be on under the legend "Feed Ballots." The electronic vote counter is now ready to "read" ballots.

The ballots may be fed as rapidly as desired, one at a time, with the top of each ballot being fed first into the unit. The printing should be up and, with the ballots fed in this manner, the corner from which the tear-out stub has been removed will be in the upper left. After each ballot has been fed, a numerical display will indicate the total number of ballots which have been processed by the machine.

After all ballots have been processed, the following procedure is followed to obtain the total number of votes cast for each candidate or issue. The control switch is advanced from the "Read" position to the "1" position which represents the first ballot column and a light under the head of the first column of the read-out sheet will be lit, confirming that it is the column from which the totals are to be obtained. The slide-bar is positioned to frame a candidate's name in the cut-out of the slide bar. Depressing a "Read" button causes a display of the total number of votes for this candidate. The "Read" button must be released before the next total can be displayed. Sliding the bar into position to frame the next name and again depressing the "Read" button causes the total number of votes for the next candidate to be displayed. Repeat this operation until all the totals for the first column have been displayed.

In order to read totals from the second ballot column, the control switch should be advanced to "2," and the light at the head of this column will come on. With the slider, frame the first candidate's name, and depress the "Read" button to display the vote total for the candidate. The same procedure is followed with the additional candidates in the column.

In a similar fashion the totals for each candidate or proposition in the remaining columns of the ballot may be displayed. At any time, the operator may go back to any ballot item to reconfirm the totals.

In order to proceed with the next precinct, or, in the case of a primary, another party return the control switch to "Program" and turn off the power switch. The entire procedure described for the first precinct is repeated to obtain the new totals.

It is therefore an object of the present invention to provide a novel, automatic programming routine for a digital computer.

It is another object of the present invention to provide a vote counting machine for paper ballots having a novel programming mechanism.

It is a further object of this invention to provide an improved vote counting machine for paper ballots possessing very high reading accuracy and reliability.

Another object of the present invention is to provide a vote tallying machine of the character described which is relatively inexpensive to manufacture and maintain.

Still another object of the present invention is to provide a vote counting machine for tallying scrambled paper ballots, which is compact, portable, simple to operate.

Yet a further object of the present invention is to provide a vote tallying machine of the character described which will permit a read-out in direct, readable, decimal form of the accumulated vote total as to any given candidate at any desired time.

It is yet an additional object of the present invention to provide a universal counter in which a plurality of storage counter cells share, in common, electronic reading, addressing, and counting circuits for the accumulator of totals within the store counter.

It is still a further object of the present invention to provide a counter for recording the presence or absence of marks in predetermined location on a record, and for displaying the accumulated total of marks in a particular position of a plurality of similar records.

It is still another object of the invention to provide a vote tallying machine having a single set of reading elements for successively detecting all of the voting marks made on a ballot and for accumulating and selectively displaying the totals of marks in a particular location of a plurality of ballots.

The novel features which are believed to be characteristic of the invention, both as to its organization and method of operation, together with further object and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

FIG. 1 is a block diagram of a vote tallying system according to the present invention;

FIG. 2 includes FIG. 2a, which is a top view of a suitable ballot and FIG. 2b which is a top view of a corresponding Programming Sheet;

FIG. 19 is an idealized diagram, partially in block, of a portion of the memory channels and the circuits adapted to read and write information onto the drum;

FIG. 21 is an idealized representation of successive information entries into the drum during various operational phases of the present invention.

The vote tallying machine of the present invention operates in three major phases, namely: programming, ballot processing, and vote read-out. These three major phases are further divided into twenty-four sub-phases which control and time-sequence all operations. Some of these sub-phases are additionally further divided into branching sub-sequences so that data may be serially examined for each ballot column.

Figure 1:
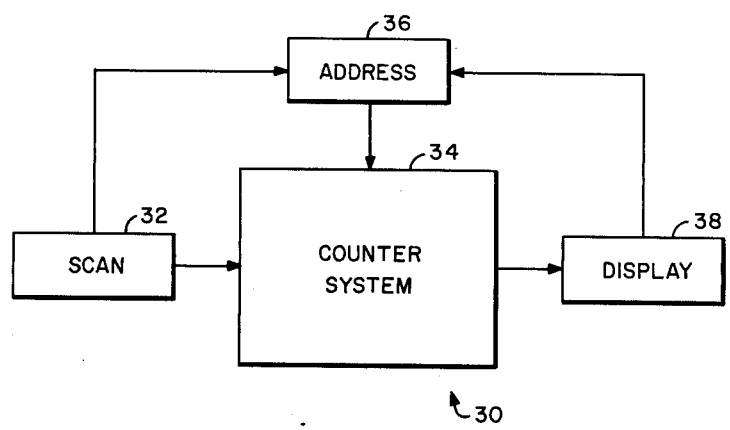

Basically, however, the system might be broadly viewed as a combination of an input mechanism 32, a data processing and memory device 34 and a display device 36. With reference to FIG. 1, the system is there represented as such a block 30 and includes these elements. It will be understood, that the preferred embodiment utilizes a magnetic drum as a memory store and which because of the dynamic characteristics of a serial drum memory, also can be readily adapted to perform both of the data conditioning and computation as well.

Figures 2A, 2B:
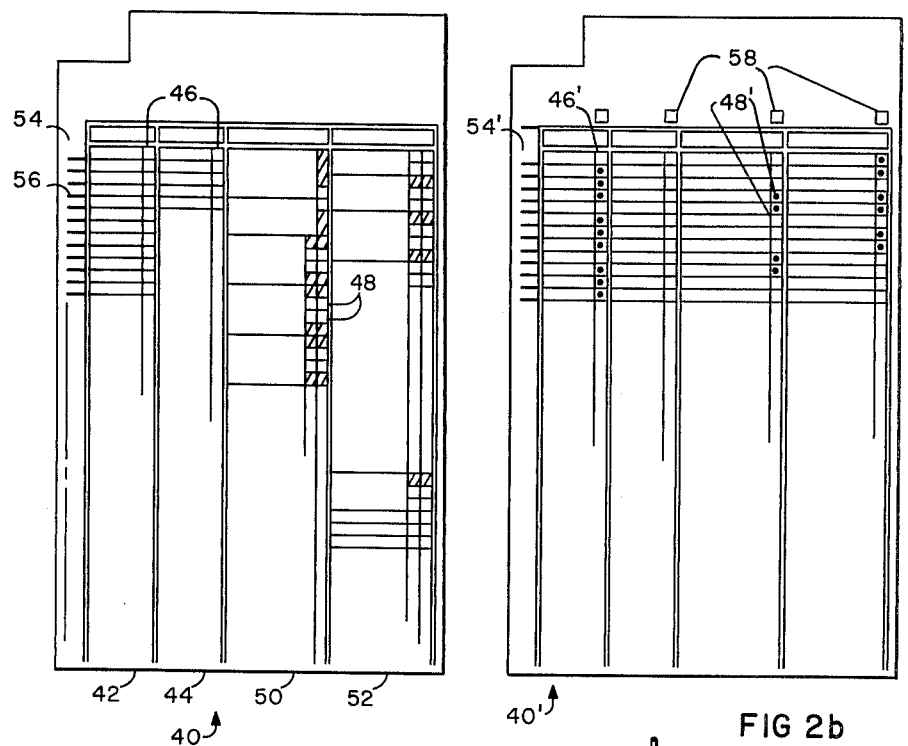

A typical ballot 40 of the type used in the State of California is shown in FIG. 2a. It will be with reference to the tallying of votes cast with ballots substantially similar to these that the present invention will be explained.

There are three basic types of voting situations for which votes must be recorded by a ballot 40. Firstly, there is the election of office seekers, where one or more from a group of candidates may be chosen. The present invention is designed to prevent over voting, that is, for example, if only two of a possible seven candidates are to be chosen, then no more than two markings will be permitted for that particular office. If more than two are found to be present on any ballot, the machine will entirely disregard this ballot as to such office, if such is the requirement of the local election laws. Voting of this first type may usually occur in either of the first two relatively narrow columns 42, 44 of the ballot 40, and a voting box 46 is provided for each candidate with provision of extra spaces in which the names of additional candidates may be written in and voted for.

In addition to the voting for office seekers, the ballot 40 must also accumulate the votes for or against specific measures or propositions referred for a decision to the electorate. Typically, in such an instance, two boxes 48 are provided in connection with each measure, one of which, if marked indicates a "yes" vote, and the other of which, if marked, indicates a "no" vote, on that particular measure. Such measures are usually placed in the relatively wide columns 50, 52, of ballot 40.

Finally, there may be included in a ballot, a recall petition for the recall of a particular official. In such a circumstance, the ballot will ordinarily include the name of one or more office seekers to replace the incumbent office holder, should the recall succeed. In such circumstance, the law usually requires and therefore the machine is designed to count the votes for the office seekers *if and only if*, the particular voter has also voted properly on the question of the recall petition. Either a YES or NO vote is required, but not both. Such a situation is indicated in the lower portion of the right hand column 52.

The ballot 40 is printed with black ink on various colored papers and is typical of those presently in use throughout the State of California. The most striking difference between ballot 40 and those presently in use, is the provision of a timing track 54 on the left hand side of the ballot 40. In addition, predetermined horizontal alignment must be maintained across the ballot. That is to say, the beginning and/or the end of each possible measure across the ballot must be horizontally coincided and the printed portion must not be skewed with respect to the edges of the paper. That is not to say, however, that a measure, such as the first in the relatively wide, measure columns 50, 52, may not extend through several timing marks, which would correspond to spaces for votes for office, in the first two, relatively narrow columns 42, 44. However, much of the space of these wider or higher positions in which a mark might be made by the voter, should be blocked out, so as to limit the area in which the voter is permitted to mark the ballot, as for example, the proposition voting blocks 48.

The timing track 54, in accordance with the presently preferred embodiment of this invention, consists of a series of marking bars 56 or horizontal lines, aligned in a vertical column. Each of these bars 56 is approximately $\frac{3}{32}$ inch wide and ½ inch long. The top of each of the bars 56 is aligned with the lower line at the bottom of each permissible voting square 46. These marking bars 56 are spaced vertically ⅜ of an inch apart (from the top of one bar 56 to the top of the next bar 56, therebelow) thus making each voting box 46 approximately ⅜ of an inch high. In addition, the vote marking area allotted to each voting position, whether for an office, a measure, or recall is made approximately ⅜ of an inch wide.

The width of the ballot 40 is preferably either 8 inches or 14 inches. The width of each column should be a minimum of 2½ inches and may be as wide as a maximum of 5 inches. In a preferred embodiment, up to four columns are permitted. The longest ballot presently accepted by the preferred embodiment is 24 inches. Within the scope of the present invention, machines might easily be devised which can handle ballots of other lengths, widths, and internal configurations.

Thus, with the preferred embodiment, it is possible to have as many as fifty voting locations per column, assuming a 4½ inch heading on the overall ballot. Ballots which are shorter than 24 inches will be accepted by the machine, but in order to be able to readily instruct the machine, a shorter ballot, say one which is 16 inches long should have a number of timing marks equal to a multiple of 10, such as 20, 30 or 40.

The preferred embodiment has been designed to require a minimum number of "rules" or boundary conditions, in the organization of the paper ballot. The rules which are imposed include:

(1) No office may appear on more than one column; i.e. no "continued in next column" is permitted.

(2) There may be no more than 15 offices and/or issues in each column.

(3) If a recall petition is on the ballot, the place on the ballot for the alternate office seekers must follow, the "yes" or "no" vote for the recall petition without intervening offices.

(4) There must always be one unused space of at least one voting square between offices and measures. This space is usually occupied by the heading for the office being voted upon. In the case of measures, the space may be provided by locating the "yes" and "no" voting space in such a manner that an unused space ⅜ of an inch by ⅜ of on inch is provided above and below the spaces wherein the voter may place his mark.

(5) The "yes" and "no" voting square spaces for each measure must always be disposed one directly above the other, with no intervening space between them.

The vote counting machine of the present invention permits any desired positioning of candidates and issues for any given election at each polling place providing the physical size and columnar division of the different ballots is the same. The same machine can receive these differently oriented ballots, and tabulate the votes of each correctly, provided that the machine is properly programmed for each group of ballots, all ballots are separated by group and each group it tallied individually.

The means by which a program is introduced into the machine, is of the utmost simplicity, requiring no special skill on the part of the operator. Also, any number of candidates for whom votes may be legally cast for a given office can be accommodated by the system of the present invention.

A set of three Programming Sheets is used to instruct the machine about the format of a particular ballot and a typical Programming Sheet 40' is shown in FIG. 2b. The Programming Sheets must be the same size and have the same column width as the ballots 40 to be used and should be printed at the same time. It is preferable to use a full grid of lines ⅜ of an inch apart on a Programming Sheet, whereby the lines in each column are numbered from top to bottom, as shown and each has a voting box 46', 48' corresponding to the ballot 40 voting boxes 46, 48, respectively.

The timing track 54' is provided with one additional line, approximately an inch above the first line, for a total of 51 lines in the timing track 54' of the Programming Sheets 40'.

Above the heading of the grid work are small square boxes 58 approximately the same size as a "voting" square which are used to identify the Programming Sheets. These code boxes are exactly in line with the "voting" squares 46', 48', at the grid work and also correspond to the number of columns on the ballot 40, a box 58 appearing above every column on the Programming Sheet 40' regardless of the number of columns.

Three Programming Sheets 40' are used to program the machine. Programming is done by marking each of the Programming Sheets in using the standard marking device, in locations determined by the layout of the ballot 40. The ballot 40 can therefore be used as a guide in preparing the Programming Sheets 40'. Preferably a ballot is placed on a surface illuminated from below and the Programming Sheet number 1 can be overlaid. Either the ballot or Programming Sheet number 1 can be used as a guide to prepare Programming Sheets number 2 and number 3, but the use of a ballot is preferred. To avoid confusion, as soon as Programming Sheets are prepared for a particular ballot format, they should be clearly identified as corresponding to that format.

Programming Sheeet number 1 contains a mark in every "voting" location of the ballot in which a voting mark can be expected. This is to instruct the machine of the permissible voting locations. The code boxes 58 on top of the grid work are completely filled in with a black mark; best using a black marking pencil. A large digit "one" should be then written in the heading on top for convenience of the operator. In one embodiment, using a four column ballot 40, Sheet number 1 was identified by marking the second and fourth boxes, Sheet number 2 had the first and third boxes marked and Sheet number 3 had the third and fourth boxes marked.

Programming Sheet number 2 is used to indicate the number of votes to be allowed for a particular "office." A "vote for one" office on the ballot would receive a mark only in the first location of that office on Programming Sheet number 2. If a "vote for two" is permissible, the first and second locations associated with that office on the ballot are marked. "Vote for X" where "X" can be any number, is handled by marking the first "X" boxes in the required location.

The proper code boxes on top of the grid work to identify Programming Sheet number 2 are filled in black. Also write a large digit "2" in the heading on top.

Programming Sheet number 3 identifies a Recall Election issue whereby either a "YES" or "NO" vote is required on the recall question before a vote for a candidate is permitted. The Recall Issue is identified to the machine by marking the "YES" location on the recall proposition on Programming Sheet number 3, the proper code boxes are filled in black and a large digit "3" is written at the top of the sheet.

Figure 3:
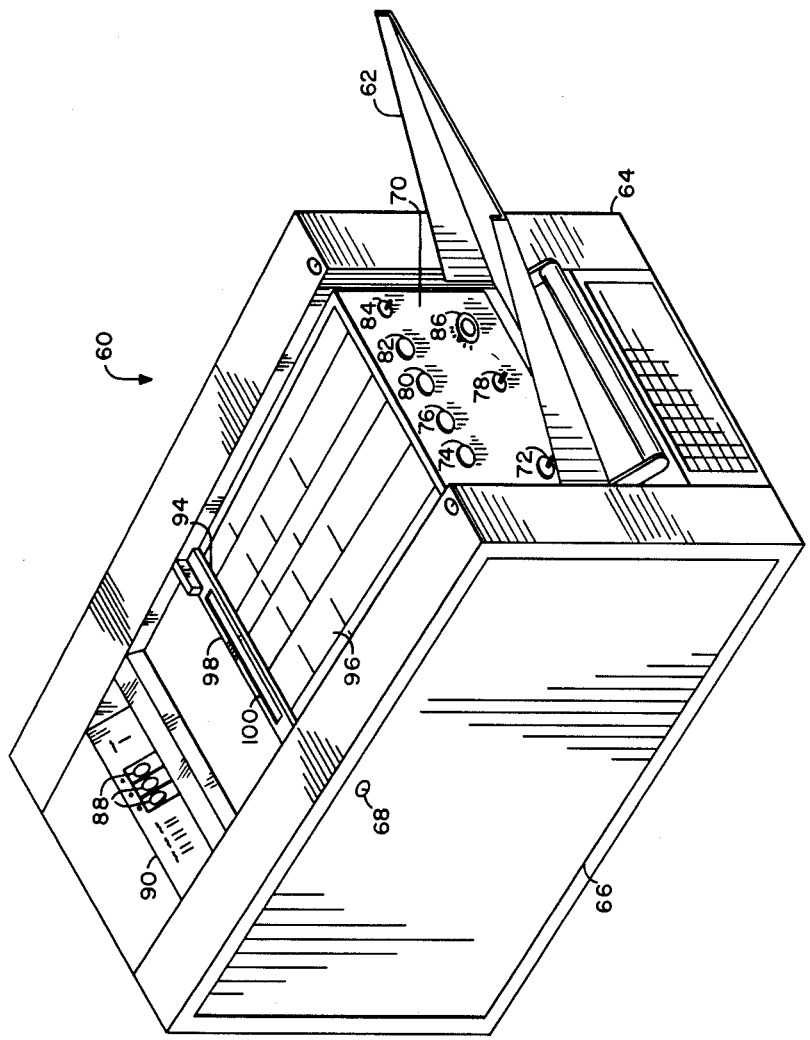
FIG. 3 is an isometric view of a vote tallying machine according to the present invention.

Turning next to FIG. 3, there is shown an overall view of a vote tallying machine 60 according to the present invention. The machine includes a feed chute 62 through which programming sheets and ballots are fed into the machine for processing. The machine is enclosed by a metal cabinet 64 which serves to house the component part and to protect them from unauthorized tampering. Removable panels 66 including locks 68 provide a means for authorized access to the internal mechanism for the purpose, for example, of adjusting the scanning mechanism for a particular ballot configuration for setting a switch to determine the ballot length.

A front panel 70 is provided with a plurality of control elements. Among them is a power toggle switch 72 and an associated power signal lamp 74, a ready lamp 76, which is illuminated after a predetermined time interval when the magnetic drum memory is running at operating speed. A reset push button 78 is provided to clear errors signalled by a feed error lamp 80 and a program error lamp 82. A buzzer, not shown, provides an audible alarm signal to supplement the visual alarm signal provided by the feed error lamp 80. A second, different audible alarm could be added to supplement the program error lamp 82. A read push button 84 is used to command a display as will be explained in greater detail below. A multi-position rotatable switch 86 has six positions respectively associated with different phases of the machine's operation. In a first position, the phase selector switch 86 enables programming of the machine, in a second position ballot reading is enabling and in the third through sixth positions inclusive, each of four columns of a ballot can be read from and vote totals displayed.

Figure 8:
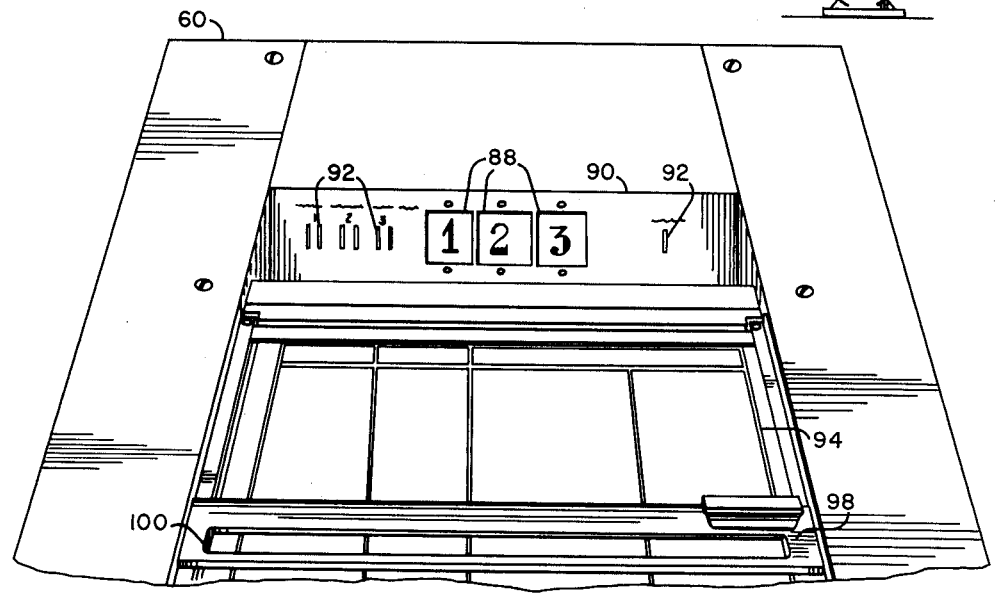
FIG. 8 is a top, isometric view of the read-out and display portion of the vote tallying machine of FIG. 3.

Continuing with the machine's description and with further referen to FIG. 8, there is shown a better presentation of the display portion of the machine and the read out unit. On a display panel 90 there are a plurality of individual signal lamps 92 which are illuminated at various times to indicate a course of action to be taken by the machine operator. To the left, as viewed in FIG. 8, there are lamps associated with the feed of programming sheets and each is illuminated, in turn to indicate the next action to be taken by the operator. By the center of the panel, the main display lamps 88 are positioned and are adapted to provide a display of decimal digits. On the right side of the display panel 90 is a single lamp 92 identified by the legend "feed ballot" and is illuminated whenever the machine is prepared to receive a ballot during the read phase of operation.

On the flat surface of the machine, intermediate the front panel 70 and the display panel 90 is the read out mechanism 94 which includes a Read Out Sheet 96 that is a substantial replica of the ballot for which the machine is programmed and a slider bar 98 with a cut out frame portion 100 which is used to "frame" a particular candidate or issue, the total votes associated with which it is desired to display.

Figure 9:
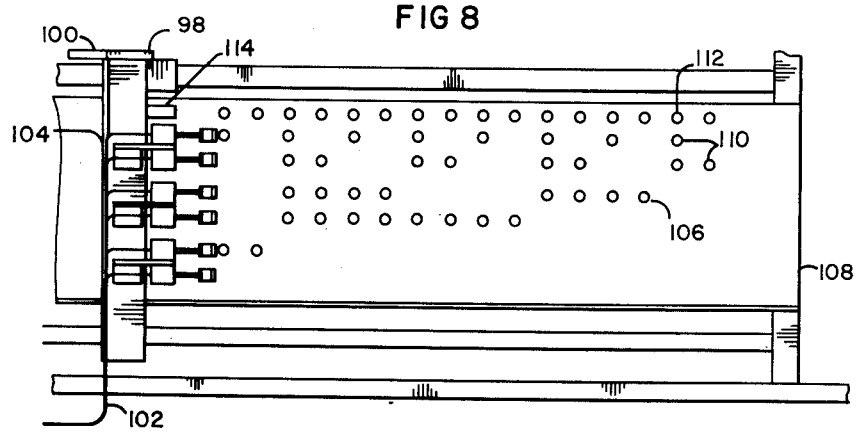
FIG. 9 is a side view of a position encoder used for read-out and display.

Turning to FIG. 9, there is shown the remaining mechanism associated with the read out assembly 94 and includes a travelling position to digital encoder device made up of a plurality of snap action switches 102 mounted on a vertical bar 104 that is connected to the slider bar 98. A position encoder 106 is a flat metal plate 108 into which a plurality of holes 110 have been drilled, arranged in a plurality of rows according to a binary coded pattern, each vertical column corresponding to a different binary code. Each of the switches 102 is arranged to travel adjacent the plate and to change its contact configuration upon engaging a hole 110. A separate row of holes 112 in conjunction with a detent 114 mounted on the vertical bar 104 provides a plurality of detented positions in which the read out slider is held substantially in place and in each detented position, the switches 102 contact the plate 108 to provide a unique signal combination representing the position of the slider bar 98.

Figure 4:
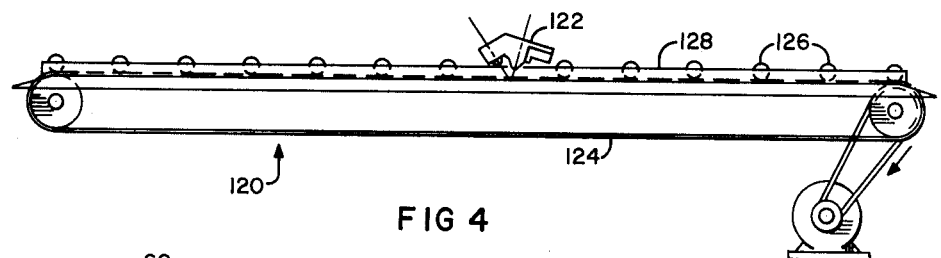
FIG. 4 is a side sectional view of a ballot transport mechanism suitable for use in the present invention.
Figure 5:
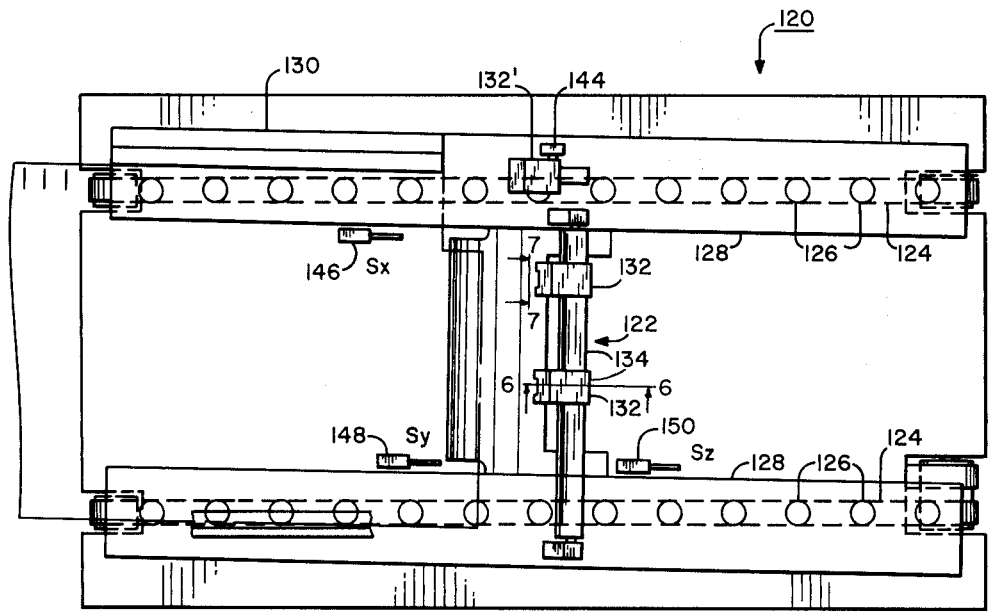
FIG. 5 is a top view of the transport mechanism of FIG. 4.

The ballot transport mechanism, which is used to carry a ballot through the machine for processing, is shown in side sectional view in FIG. 4 and in a top view of FIG. 5.

The ballots are hand-fed into the feed chute 62 opening at the front of the machine 60 approximately 3 inches into the machine, until the transport mechanism 120 can grip the ballot and pass it under scanning station 122. Before passing under the scanning station 122, the ballot must be aligned with its left-hand edge to be perpendicular to the line of scanning, so that the timing marks 56, to the left of the ballot, can be reliably related to the voting squares 46, 48.

The transport mechanism used is similar to that described in the above mentioned patent to Fechter et al., and consists of two or three belts 124 moving at a uniform speed. In a preferred embodiment, the ballot is held on top of the belts 124 by means of a number of ½ inch diameter steel balls 126, uniformly distributed along the entire length of the transporting belts 124. The steel balls 126 are held in a retainer 128 over the belts 124 so that the balls 126 are free to rotate.

The alignment of the ballot is accomplished by the use of a chute which directs the ballot to a guiding edge 130 near the outside of the left-hand belt. The edge is orthogonal to the line of the scanning heads and the direction of motion of the belts 124 is slightly skewed with respect to the guide edge. The ballot, having a tendency to move parallel with the belt 124 therefore moves towards the guiding edge 130 until the ballot hits the guiding edge 130. The left-hand edge of the ballot is continuously urged against the guiding edge 130. This guiding action continues while any portion of the timing marks 56 or the voting squares 46, 48 are under the scanning station 122. The scanning station 122 includes a number of individual scanning heads 132 (two of which are shown), which are individually movable along a mounting bar 134 so that each scanning head 132 can be aligned with a marking column 42, 44 on the ballot 40 or Programming Sheet 40'. The mounting bar 134 is precisely perpendicular to the guiding edge 130 near the outside of the left-hand belt 124.

Figures 6, 7:
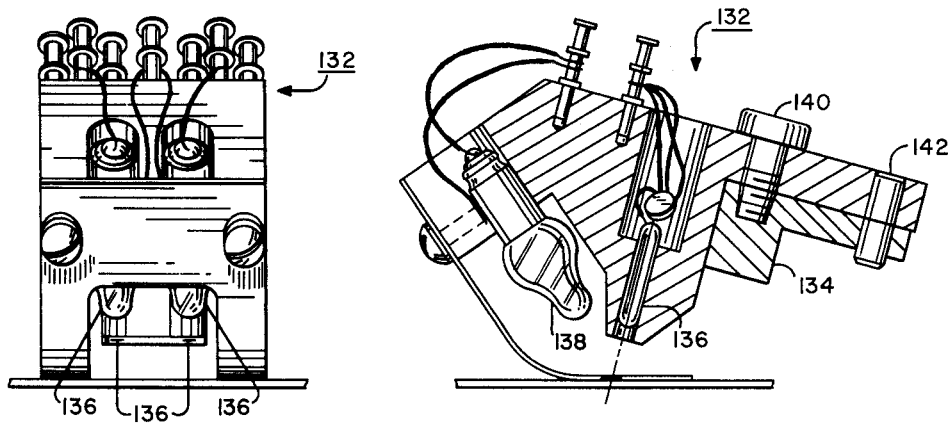
FIG. 6 is a side sectional view of a scanning head used in the present invention taken along line 6—6 of FIG. 5 in the direction of the appended arrows.
FIG. 7 is a front view of a scanning head of FIG. 5 taken along line 7—7 in the direction of the appended arrows.

With reference to FIGS. 6 and 7 where a scanning head 132 is shown in greater detail, it will be noted that a scanning head 132 may include two photo diodes 136 mounted side by side in order to scan the total area of the voting box or square 46, 48. The area is illuminated by two miniature incandescent light bulbs 138, each individually adjustable for brightness and mounted in advance of but shielded from the two photo diodes 136. The adjustment of the miniature light bulbs 138 is done outside the scanning head 132 by a controlling circuit (not shown).

As can be seen from FIGS. 5, 6 and 7, the scanning head mounting bar 134 is orthogonal to the left side guiding edge 130 approximately at the middle of the machine 60. The scanning heads 132 are attached to the mounting bar 134 with a machine screw 140 in front and positioned precisely with a dowel pin 142 in the back. A hole pattern of a tapped hole and a reamed hole is repeated across the entire length of the mounting bar 134 in ½ inch increments. The scanning heads 132 therefore can be mounted in virtually any position on the bar, limited only by the hole pattern and the ½ inch increments.

The scanning heads 132 can be lifted out for servicing or relocating by removing the screw 140. For pre-election alignment, each of the heads 132 are moved to the proper position so that they line-up with the columns of voting boxes 46, 48 on the ballot 40.

The timing mark scanning head 132' always stays in the same relative horizontal position and no adjustment is normally required. However, a front-to-back adjustment is provided by a sliding mount and a knurled locking screw 144. Adjustment is required to establish the proper timing relationship between timing marks and the voting box so that all valid votes can be properly ascribed to the proper candidate or proposition.

When a ballot or programming sheet is inserted into the machine, a number of checks are made to determine that a "good" document has been properly fed. Of major importance is the need for the document to be fed face up with the top inserted first. By using two miniature snap action switches, S$x$ 146 and S$y$ 148 and taking advantage of the fact that all valid documents have the top left corner removed where normally the voters' receipt is removed by election officials and given to the voter, it is possible to make this determination.

It can be seen that Switch S$x$ 146 is mounted "prior" to or in advance of the lateral position of Switch S$y$ 148. The spacing is arranged so that S$y$ 148 closes first on a "good" ballot. However, if an improper ballot is fed or a proper ballot is fed incorrectly, Switch S$x$ 146 closes first, setting a Feed Error flip-flop (not shown) which prevents utilization of any data from the ballot. This same test applies equally to both the ballots and the Programming Sheets.

11

The timing marks 56 are used both to identify data taken from the ballot to program sheet counting marks, and to "strobe" or gate the voting marks into the staticizing circuits as explained in greated detail in connection with FIG. 12 below.

If for any reason one of these marks is not scanned (or an extra one is detected) then the data presumably has been shifted and is probably incorrect. Thus, at the end of the ballot, determined by the state of a third switch Sz 150 signalling that the ballot has left the scanning station 122 a check is made that a mark counter contains a number corresponding to the setting of a ballot length switch (not shown) on the inside of the machine which determines the length of an expected ballot. The ballot length switch is set when the machine is adjusted prior to operation. The comparison is performed on both the ballots and program sheets and, in case of an error, the Feed Error flip-flop is set so that the data will not be utilized.

On the Programming Sheets 40', an additional check is made to determine that the correct sheet is being fed at the proper time. The code boxes at the top of each column are selectively marked to generate a code pattern across each sheet. Wired into the logic of the unit is a corresponding pre-selected coding that must be matched by each Programming Sheet to permit operation to proceed. In case of failure to agree, the Feed Error flip-flop is again energized and the data is not utilized. This incidentally serves as a preliminary test of all of the scanning circuits since the code combinations are arranged to require a "mark" and a no "mark" indication from each of the scanning heads 132 during the programming phase of the operation.

Figure 10:
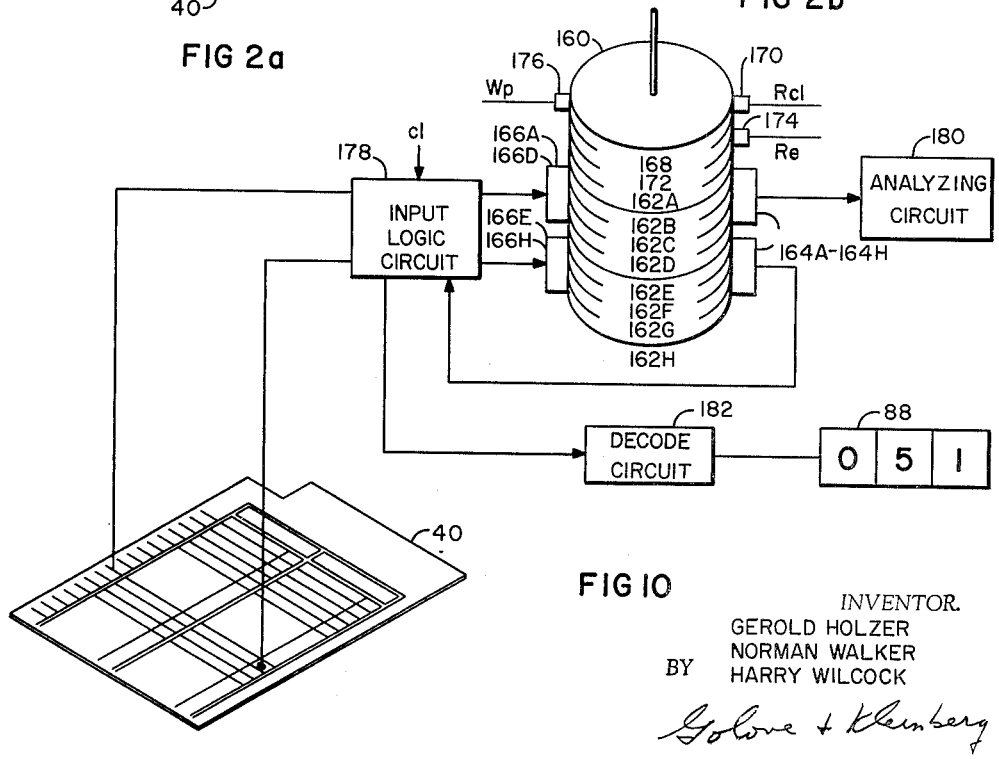
FIG. 10 is an idealized block diagram of the information flow-path from ballot to display through the memory.

Turning next to FIG. 10 there is shown an idealized diagram of the major components of the electronic counter portion of the present invention.

In a preferred embodiment, the memory system of the vote counting unit consists of a magnetic drum 160 and associated circuitry for both long and short time storage of data. The drum 160 rotates at 3600 r.p.m. and has a clock rate of approximately 48 kc./s. The drum drive system is not shown.

The surface of the drum is divided into eight information channels $D_A$–$D_H$, 162A–162H which are used on a re-circulation basis of 500 bits of information or data each. These 500 bits are obtained from 498 storage cells on the surface of the drum plus two bits of flip-flop storage which are used for logical analysis and for re-writing information on the drum.

By recirculating the data in this manner, each bit of each channel is available approximately every ten milliseconds since the contents of each data cell are read as the drum moves past fixed read heads $R_A$–$R_H$ 164A–164H and information is written (after examination and possible changes) exactly 498 bit times "up stream" or "prior" to the read heads by set of second heads known as the write heads, $W_A$–$W_H$ 166A–166H.

Each column of a ballot is associated with two channels of the drum and the re-circulating registers contained thereon. One drum channel is used for long term storage of the "program" and the short term storage of the ballot votes and processing marks. The other drum channel is used to store the cumulative total votes of each candidate or measure. The two circulating registers associated with first Column of the ballot are designated A, 162A and E, 162E. Channel A, 162A, is used for the program and E, 162E, is for the cumulative totals. Similarly, registers B, 162B, and F, 162F, are used with a second column of the ballot, and so on.

In addition to the eight recirculating registers on the drum 160, there is also a permanently recorded clock channel 168 which has written thereon 800 timing marks or bits which are read by a clock read head $R_{cl}$ 170. The clock channel 168 is used for internal timing of the memory system and each mark written therein corresponds to an information cell in the individual recirculating registers.

12

Still another recirculating channel is provided, designated the parity channel P, 172 including a read head $R_p$, 174, and a write head $W_p$ 176. The parity channel 172 is used in conjunction with a parity generating system, described in greater detail below in connection with FIGS. 16 and 17, which helps to prevent error in the system.

As indicated in FIG. 10, information is scanned from a ballot 40 or program sheet 40' and is applied to an input logic circuit 178, the output of which is applied to the appropriate write head. At the proper time in the operational sequence of the machine information is read from the recirculating channels and is applied to an analyzing circuit 180 which re-records information on the drum. On demand, the contents of the accumulator registers in channels $D_E$ through $D_H$, 162E–162H are applied to a decode circuit 182 which transmits information to the display device 88.

Figure 11:
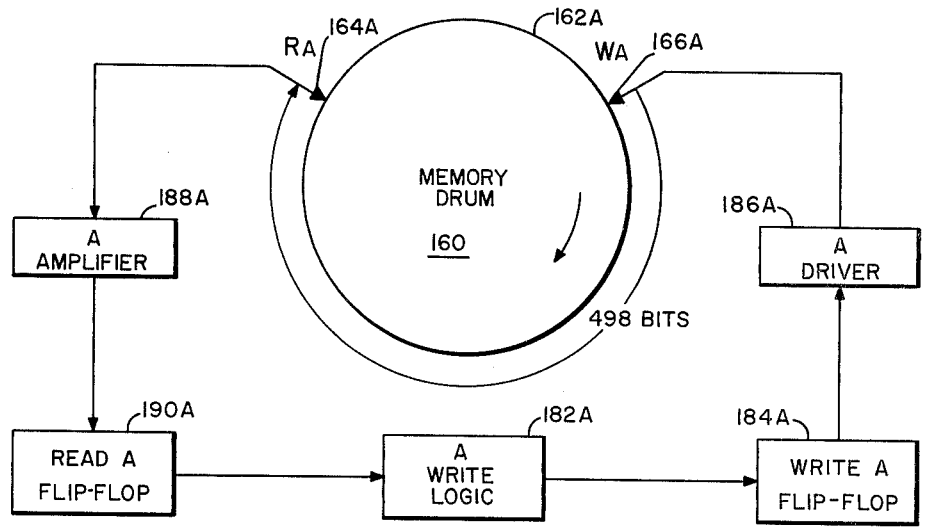
FIG. 11 is an idealized block diagram of the information paths to and from the memory of the present invention.

The recirculation path of an individual recirculating register, for example, the A channel is indicated in FIG. 11. It is to be understood that channels B through H are substantially similar in structure and therefore will not be separately described. Similar reference characters, with appropriate letter subscripts are used to describe the corresponding elements associated with any of the other channels.

All information to be written in the channel is generated in an A channel logic unit 182A which is controlled by a predetermined combination of signals read from the channel and from other, external sources, such as the input logic circuit 178. At each bit time, the logic circuit 182A applies a signal to a channel A Write flip-flop 184A, the output of which is applied to an A driver circuit 186A. The output of the channel A driver circuit is applied to the $W_A$ write head 166A and information is recorded in the A channel.

After a delay equivalent to 498 clock pulses the recorded bit of information is read by the A read head $R_A$ 164A and is applied to an A amplifier 188A and staticized in a read A flip-flop 190A. The output of the read A flip-flop 190A is then one of the inputs to the A logic unit 182A and may be rewritten into the A channel.

Figure 12:
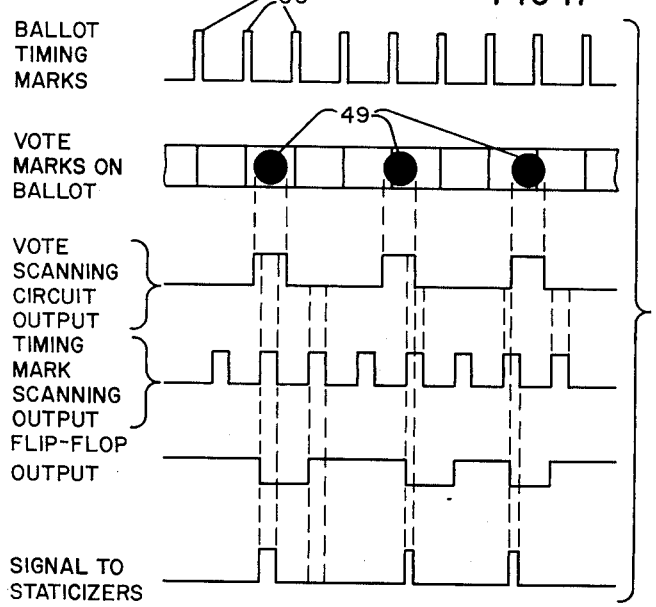
FIG. 12 is an idealized timing diagram correlating the marks on the ballot to the output of a scanning circuit.

Turning next to FIG. 12 and also with reference to FIG. 10, there is shown an idealized diagram, in partially graphical form, which correlates the location, both in time and position, of ballot timing marks 56, voting marks 49 in the appropriate voting squares 46, 48 the signal output of the scanning head 132' associated with the timing column 54, and with the signal output of a single scan head 132. As will be seen, the scanning outputs are combined to produce a signal which is applied to a staticizer prior to entry into the memory system.

This particular technique is sometimes known as "strobing" and is frequently used in synchronous, self-clocked systems. In FIG. 5, above, it can be seen that the timing mark scan head 132' is slightly offset, in advance of the other scanning heads 132, so that a timing mark on a ballot which coincides with the beginning of a voting square, generates a signal corresponding to the timing mark, at a time when approximately the middle third of the next following voting square is aligned with the other scanning heads 132. When signals representing the presence of a mark from the vote mark scanning heads 132 and the timing mark scanning heads 132' coincide, an output signal is provided, which is applied to a suitable staticizer.

In those instances when a voting mark 49 overlaps either the upper or lower border of the voting square, but has more than half of the mark within a square, an appropriate gated signal is provided at the time corresponding to the proper voting square. In such a case, the output pulse is of shorter duration than would be the case if the voting mark 49 were properly placed, entirely within a voting square.

Figure 13:
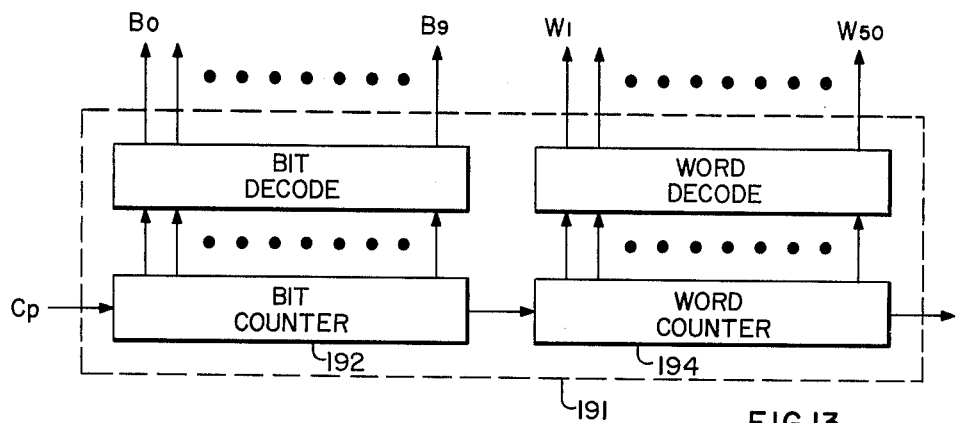
FIG. 13 is a block diagram of a "drum" counter.

Turning next to FIG. 13, to identify any particular bit that is read from the drum 160, a drum counter 191 consisting of ten flip-flops has been provided. This counter consists of two portions, a bit counter 192 which counts the bits with a word and a word counter 1940 which counts words.

The bit counter 192 is driven by and counts the system clock pulses from the clock track $D_{c1}$ 168 consisting of 800 evenly spaced bits. The bit counter 192 generates the B-0 through B-9 timing pulses and contains four flip-flops connected as a modulo ten counter. The word counter 194 contains six flip-flops connected as a modulo-fifty counter and is driven by the cycling of the bit counter 192. Therefore, by combining output signals of the counter a unique pulse can be generated to identify precisely, any one particular bit of data from the drum.

Both of these counters 192, 194 are synchronized at the time of power turn-on by resetting all of the flip-flops to the "off" state representing a zero count for both. The counters start counting at the closure of a switching relay which is turned to close after the drum has gotten up to speed.

Figure 14:
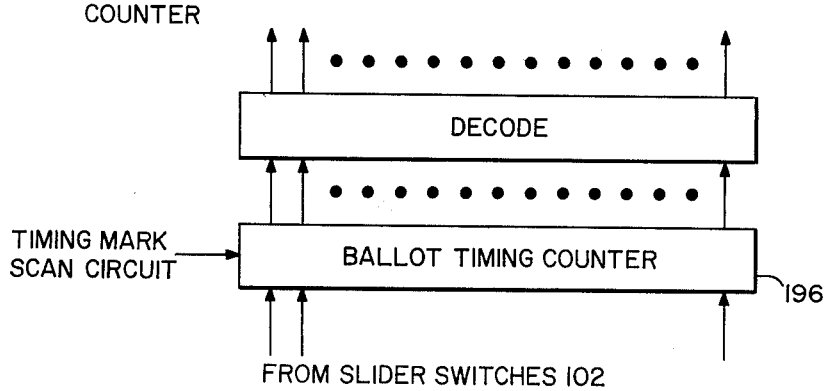
FIG. 14 is a block diagram of a "ballot timing" counter.

In FIG. 14, there is shown in block form, a Ballot Timing Counter 196 which is a straight binary counter consisting of six flip-flops. This counter is used to define a particular candidate or proposition to the remainder of the system and corresponds each horizontal row on the ballot or Programming Sheet to a memory address. The count output is used to generate a command to the memory system for the location of the corresponding words on the drum.

The timing marks 56 on the ballot are counted as they pass the scanning head 132'. As the ballot leaves the scanning area, as signalled by switch $S_z$ 150, the Ballot Timing counter contains a count equal to the number of marks 56 scanned which is compared with the setting of an internal Ballot length (not shown) switch which can be used to select one of several possible ballot lengths. This counter 196 generates an address during both the programming and ballot reading phases of operation.

In addition, during the Vote Read-Out phase of operation, the Ballot Timing counter 196 is used to address the location in the drum containing the vote total that is to be read out. This is accomplished by presetting the counter, forcing it to a code combination specified by the code switches 102 on the Read-Out Slider 104.

In all cases this counter contains an address of a desired drum location. As pointed out above, the Word Counter 194 at all times signals the drum word being read from. A comparison is performed in binary form without converting to the decimal equivalent between the Ballot Timing Counter 196 and the Word Counter 194 and when there is agreement, a unique output signal is generated which then permits reading or writing on the drum.

Figure 15:
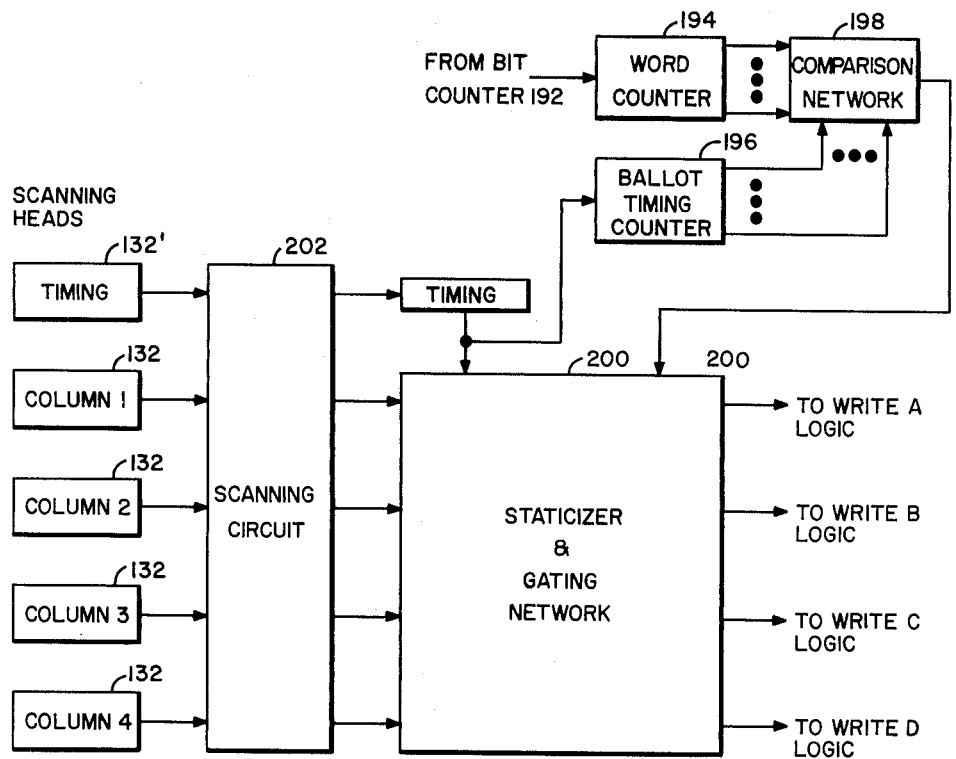
FIG. 15 is a block diagram of data input circuits.

The block diagram of FIG. 15 illustrates functionally how information is transmitted from a programming sheet or ballot to a storage cell in the memory drum. As pointed out above, the output of the word counter 194 portion of the drum output 190 is a plurality of signals representing a binary count which corresponds to the word being read from the drum. The output of the word counter 194 is applied to a comparison network 198. Simultaneously, the timing track scanning head 132' applies signals to a timing mark staticizer 200, the output of which is applied to the Ballot Timing counter. The output of the Ballot Timing counter 196 is also applied to the comparison network 198.

The output of the timing mark staticizer 200 is applied to a scanning circuit 202 which is connected to the scanning heads 132 for each of the columns of the ballot. The output of the scanning circuit 202 is applied to a voting mark staticizer 204 which staticizes and holds the output of the individual scanning heads 132.

When a signal from the comparison network 198 indicates that the number in the Ballot Timing counter 196 is equal to the number in the Word counter 194 the contents of the voting mark staticizer 204 are gated into the A Write logic block 182A, for subsequent transmission, at the proper bit time, to the write A flip-flop 184A. This assures that the voting marks are written into the "program" channels in the proper word associated with the particular candidate's voting block, being scanned.

Figure 16:
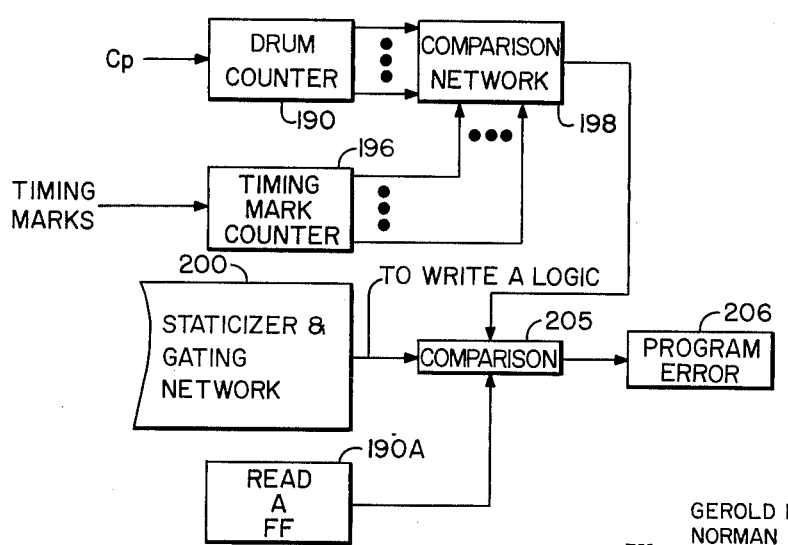
FIG. 16 is a block diagram of a program checking circuit.

Turning next to FIG. 16, during the portion of the program that the second of each pair of programming sheets is being read, the contents of the recirculating register are compared with the contents of the second programming sheet, as detected by the scanning heads 132 under control of the timing mark scanning head 132'. When the address of the drum word counter 194 coincides with the count of the Ballot Timing counter 196 as indicated by the comparison network 198, a signal enables a bit by bit comparison of the memory with the programming sheet. If the stored program differs from the sheet, a program error flip-cop 206 is triggered to give an alarm.

Figure 17:
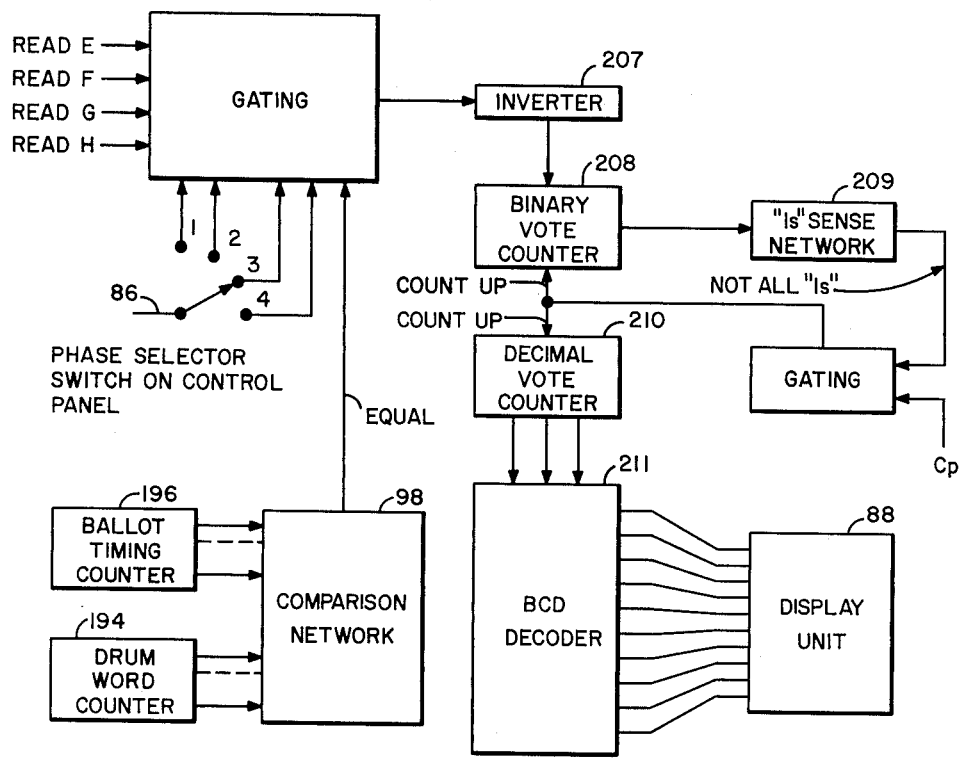
FIG. 17 is a block diagram of drum output circuits.

Similarily, for reading out totals from the accumulator registers E through H, on a selective, one at a time basis, and with reference to FIG. 17, an address comparison is made to gate the contents of a desired accumulator word of selected register into a Binary Vote Counter 208 which then stores the contents. So long as the stored count is not equal to zero, each Clock pulse $Cl$ simultaneously counts down the Binary Vote Counter 208 and counts up a Decimal Vote Counter 210 which is connected, through decoding logic 211 to the three decimal decade display 88.

Figure 18:
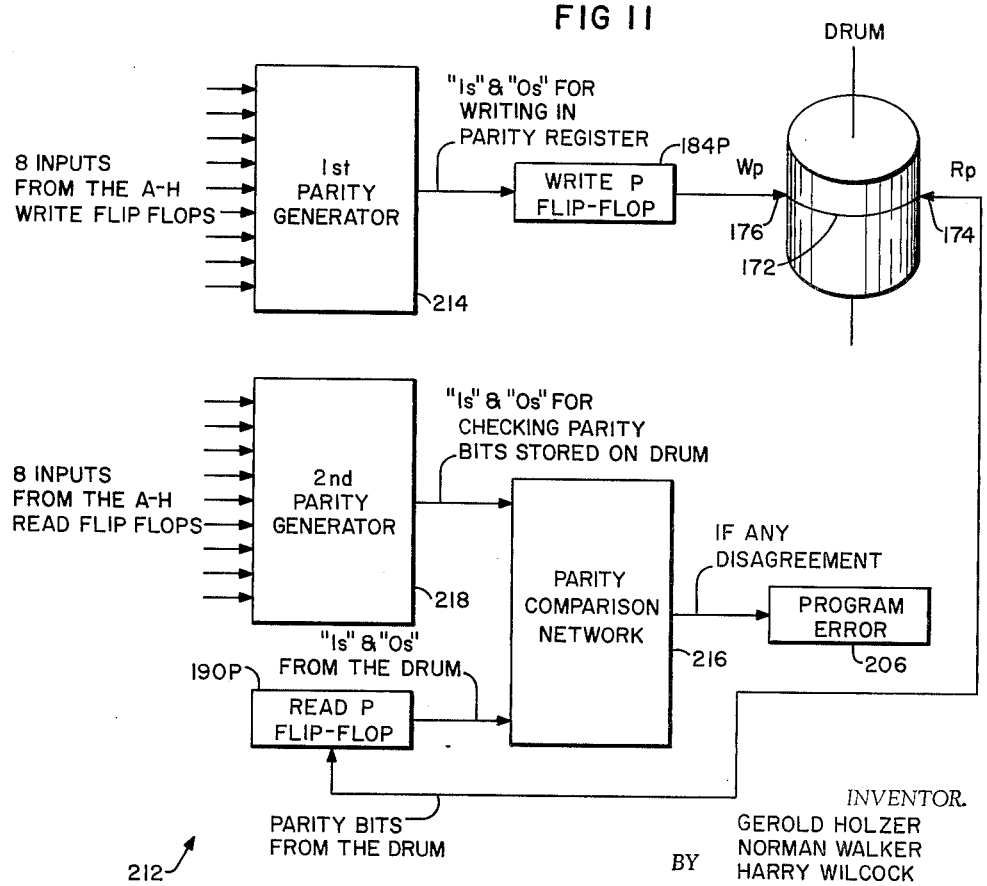
FIG. 18 is a block diagram of parity circuits.

Turning next to FIG. 18 there is shown a Parity System 212 in diagrammatic form. A first parity generator 214 receives inputs from all of the data register write flip-flops and generates a single parity bit for storage in the parity channel $D_p$ 172. The output of the parity channel 172 is read into a parity comparison network 216 and is compared, each bit time, with the output of the eight data register flip-flops which are applied to a second parity generator 218. If the data stored on the drum is of correct parity, the parity comparison network 216 should indicate agreement at all times.

If, at any time, the output of the second parity generator 218 is not identical to that of the parity channel 172, an output is provided which sets the program error flip-flop 206.

With reference next to FIG. 19, there is shown a stylized representation of portion of the A and E channels 162A, 162E of the drum.

Each recirculating register of the channels is sub-divided into fifty sections, each representing one of the fifty possible items in a ballot column. These sections are called "words" and are identified as W-1 through W-50. A further sub-division of these words is made into ten cells or bits each and are identified as B-0 through B-9.

For recirculating registers $D_A$ through $D_D$ the following identifies the use of the various bit cells, these being the same for each word:

TABLE I

B-0—not used
B-1—permissible voting location
B-2—permissible votes
B-3—"recall"
B-4—not used
B-5—vote inhibit
B-6—vote storage
B-7—not used

TABLE I—Continued

B-8—overvote mark

B-9—used to store forty-nine "1's" and "one" "0" for error detection purposes.

Bit cells B–1, B–2, and B–3 are used to store the program for a particular precinct. The interim storage of the ballot vote and processing marks is provided at cells B–5, B–6, and B–8. The remaining four cells are not normally used, but are provided to make these words the same length as the corresponding words in the accumulator registers E–H.

In the accumulator register of channels $D_E$ through $D_H$, only the total number of votes received is stored and the individual cells are weighted in binary fashion so as to accommodate numbers up to 1023, as follows:

TABLE II

| | |
|---|---|
| B–0: $2^0$ or 1 | B–5: $2^5$ or 32 |
| B–1: $2^1$ or 2 | B–6: $2^6$ or 64 |
| B–2: $2^2$ or 4 | B–7: $2^7$ or 128 |
| B–3: $2^3$ or 8 | B–8: $2^8$ or 256 |
| B–4: $2^4$ or 16 | B–9: $2^9$ or 512 |

Thus, treating the several cells of an accumulator register word as a counter, any number, representing the total votes received from a precinct, less than 1023, may be stored. This capacity is more than adequate in California for example since the California Election Code provides for a maximum of 600 voters in any one precinct.

As indicated in FIG. 19, a computation logic block 220 is shown between the read flip-flops 190A, 190E and the write flip-flops 184A, 184E. The computation logic block 220 includes of course the individual write logic units 182A through H. To aid in reader understanding the contents of the computation logic block will not be described in terms of physical components, but rather will be described below in terms of the logical equations which determined the output of the block for each combination of input signals. As is well known, suitable mechanization can be derived from any complete set of logical equations which will result in operating equipment that will perform in accordance with the equations.

Figure 20:
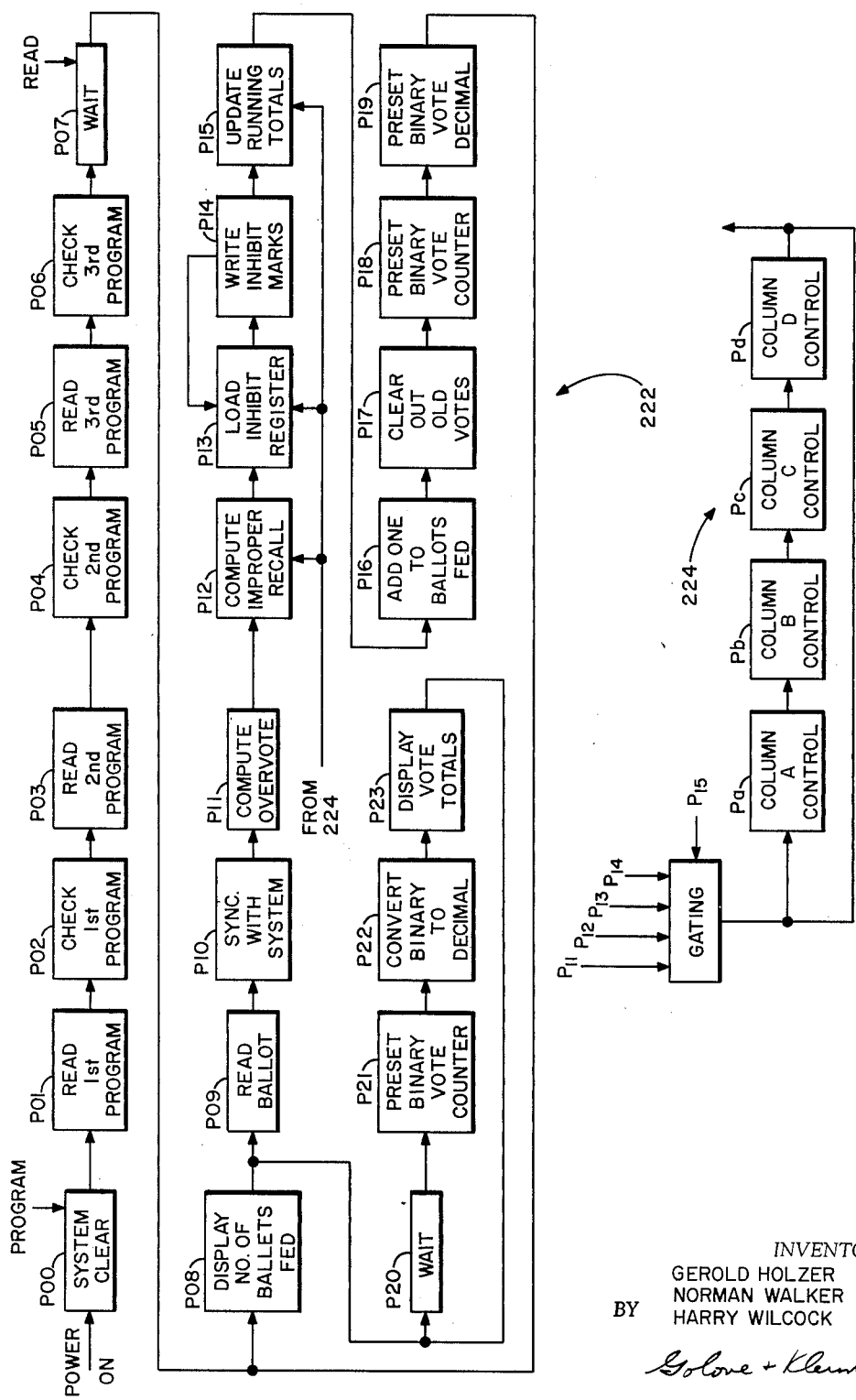
FIG. 20 is a block diagram of a phase counter of the present invention.

In FIG. 20, there is set out in a block diagrammatic form, the phase counter 227 which determines the operation of the machine of the present invention. Physically, the phase counter is made up of a ring of twenty-four flip-flops, only one of which, at any time, is in the set or "1" representing stable state. Within the computation logic block 220 is the necessary logic to trigger each succeeding flip-flop of the ring.

In the following discussion, the operation of the machine will be discussed and the logical equation necessary for machine operation will be set forth using the following symbols:

TABLE III

P–00 through P–23, incl. represents individual phase ring flip-flop
T—Signal from ballot timing
W—Word
B—Bit
G—Permissible mark
H—Votes
N—Decimal Vote Counter
Q—Binary Vote Register In the discussion of the various phases below, each discussion will include a statement of the logical expression which caused the particular phase flip-flop to be set. It should be noted that the setting of one phase flip-flop clears the prior flip-flop and preconditions the setting for the succeeding phase flip-flop.

There are three major phases of operation in the processing of ballots from each precinct, which are subdivided into twenty-four individual phase counts, P00–P23.

To generate these phase counts the Phase Counter 222 is provided consisting of twenty-four flip-flops and related gating circuits connected as a ring counter so as to control and time the sequency of all major operations of the system. Operating in conjunction with this phase counter is the Column Control sub counter 224 which identifies the particular column that is being processed at any one time. This stepping counter is composed of four flip-flops and their related gating circuits.

(I) *Programming*

This operation includes phase counts P–00 through P–07. After the machine has been set up, power turned on and the preliminary checks satisfactorily completed; it is necessary to program or instruct the unit as the type of ballots that are to be processed. This is accomplished by feeding in six previously prepared Program Sheets 40' in two sets of three. Each set is prepared independently to reduce the possibility of human error. The first sheet of a pair enables the machine to record the data and the second permits a box-by-box check of the recorded data.

Certain other checks are performed during this operation, such as the proper functioning of the scanning heads 132 as each is required to recognize code boxes 58 in accordance with a previously determined configuration. If an error is detected, either because the Programming Sheets 40' can not be correctly stored and compared or because of a bad scanning head 132, the condition is indicated by the Program Error lamp 82 which is controlled by the Program Error flip-flop 206. The correct procedure then is to "clear" the machine by turning the power off and on to re-start the programming phase. After all three pairs Programming Sheets 40' have been processed successfully, the machine is ready to process ballots 40.

*P–00—System clear.*—This is the phase assumed by the unit at system power turn on and it causes reset of all other phase and control flip-flops.

*P–01—Read programming sheet #1.*—After approximately ten seconds of warm-up time (as determined by a thermal delay relay K1 [not shown] which closes a switching relay K3 [not shown] and the Phase Selector Switch 86 on the front panel 70 in the "Program" position, the phase counter advances to P–01. At this time the first Programming Sheet #1 is fed through the unit, and the data is stored on the magnetic drum. This programming sheet programs or instructs the machine as to the permissible vote boxes 46, 48 of the ballot 40.

Each of the three programming sheets 40' has a different code pattern in the code boxes 58 above the columns so that the machine can recognize which of programming sheets is being fed. If a sheet is not fed at the correct time, the data from it will not be stored and an alarm is given. The code boxes 58 serve as a source of known data with which to test the proper operation of the scanning circuits 202.

*P–02—Check first program sheet.*—The satisfactory feeding and reading of the first Programming Sheet #1 (including both proper insertion and correct number of timing marks on the ballot) advances the phase counter to P–02. In this phase count the second Programming Sheet #1 is fed through for a box-by-box of the data stored on the magnetic drum against the programming sheet.

*P–03—Read first programming sheet #2.*—The satisfactory feeding and reading (including the exact agreement of the box-by-box check) of the second Programming Sheet #1 advances the phase counter to P–03. The first Programming Sheet #2 is fed through and data is stored on the magnetic drum. This programming sheet instructs the machine as to the number of legal votes to be permitted for each office or measure on the ballot.

*P–04—Check second programming sheet #2.*—The satisfactory feeding of the first Programming Sheet #2 advances the phase counter to P–04 and in a similar manner the second Programming Sheet #2 is fed for the box-by-box check.

*P–05—Read first programming sheet #3.*—In a similar manner, the satisfactory feeding of the second Programming Sheet #2 advances the phase counter to P–05. The first Programming Sheet #3 is fed and the data stored so as to instruct as to any recall questions.

*P–06—Check second programming sheet #3.*—As before, the satisfactory feeding of the first Programming Sheet #3 advances the phase counter to P–06 where the second sheet #3 is fed for the box-by-box check.

*P–07—Wait.*—The satisfactory feeding of the second Programming Sheet #3 advances the phase counter to P–07. This completes the programming phase of the operation and a complete set of instructions are now stored which will enable the machine to process the ballots from a precinct. In this Wait phase, these instructions are recirculated on the magnetic drum.

(II) *Ballot processing*

This operation consists of phase counts P–08 through P–19. Each ballot is fed through the unit once for the complete reading and analysis of all voting marks. As the ballot moves past the reading heads, its speed is automatically controlled to a fixed, pre-determined rate. The four scanning heads 132 and corresponding circuits (one for each column) read the voter's marks 49 and signals representing these marks are stored on the magnetic drum in relation to the timing marks printed on the left margin of the ballot and read by the timing mark scanning head 132'.

Following the "reading" of the ballot, it is necessary to check every office and measure for overvotes and to check for proper voting on any recall question. Any such improper voting will invalidate that particular office or measure, but not the remainder of the ballot, and it necessary to write an "inhibit" mark on the drum so that these votes will not be added to the running totals during the updating operation.

The running totals for each candidate and measure are stored in binary form on the drum. The updating operation requires only a cycling of the data registers on the drum so that each vote can be added to the total for that candidate. If overvote or improper recall inhibit markers are present, no updating occurs and the old totals are rewritten without change. After the complete updating of the totals, the machine recycles to the start of the ballot processing phase, P–08. Displays the total number of ballots processed and waits to receive the next ballot.

*P–08—Display number of ballots fed.*—The changing of the Mode Switch from the Program position to Read advances the phase counter from P–07 to P–08 which enables the unit to read a ballot when it is presented.

Following the updating of the ballot votes, a conversion from binary to binary-coded-decimal is made of the number of ballots that have been read. When the Binary Vote Counter 208 has counted down to zero, the phase counter on the next Clock Pulse advances to P–08 from P–19. The Decimal Vote Counter 210 contents are then displayed in the viewing windows on the top of the unit and this is the number of ballots that have been processed up to this time. Primarily, the machine is waiting to receive the next ballot.

*P–09—Read ballot.*—The proper insertion of a ballot into the unit, face up with the top inserted first, as determined by switches Sx 146 and Sy 148, advances the phase counter to P–09 during which the ballot is read and the votes are temporarily stored on the magnetic drum. On this single "pass" the entire ballot is read, as there is a scanning circuit provided for each column.

If the ballot is not properly inserted, a "Feed Error" results with the Feed Error Lamp 80 being turned on. No data from the scanning circuit is utilized. To re-establish operation, it is only necessary to press the Reset Button 78 and re-feed the ballot.

*P–10—Synchronize.*—The ballot leaving the Read Station (as determined by switch Sz) advances the phase counter to P–10 during which the phase counter waits for signals which synchronize it to the magnetic drum. During the forthcoming "analysis" of the votes from the ballot, it is necessary for the phase counter and magnetic drum to operate in synchronism.

*P–11—Compute overvote.*—The last pulse of the current drum turn, which is identified as the last or B9 bit of W50, the last word is recognized which advances the phase counter to P–11. At this time the Column Control Counter 224 comes into use. Up to this point, all operations have been parallel by columns. During P11, the operation is serial by columns. Column counter 224 is set to P–A.

In accordance with the Election Code of the State of California, for example, a number of candidates may be elected to particular offices. Thus, it is necessary to determine for each office, if the legal or permissible number of votes for that office has been exceeded. If exceeded, all votes for that office must be ignored, but the remainder of the ballot may still be valid and therefore should be tabulated.

During Phase Count P–11, the machine starts a series of operations to determine "overvoting," if any. If more than the permitted votes have been cast for any office then "inhibit" marks must be generated to prevent the entry of any of them. Examining the organization of the words in the A–D channels of the drum, for any office, the number of B–2 cells with bits stored therein represents the permissible number of votes for that office. In the B–6 cells, the actual votes are stored. Therefore, all information required for the overvote determination is stored on the drum.

In order to extract this information from the drum so that it may be utilized, two flip-flop counters are provided, a "G" counter to count the permissible number of votes, and a second "H" counter to count the actual votes cast. The counts are compared, for each office to determine if the actual votes exceed the permissible votes. Is so, a control flip-flop is set corresponding to the office which in turn causes an "overvote" mark to be written in the remaining B8 cell of the particular office. Upon completion of Column A, the column counter advances to P–B, the phase counter remaining in P–11 and Column B is examined in a similar manner. The same procedure is followed throughout Columns C and D.

*P–12—Compute improper recall voting.*—Upon the completion of the overvote computation on Column D the phase counter advances to P–12 and the column counter returns to P–A. Beginning with Column A an examination is made to determine if there has been compliance with the appropriate rules. Proper voting requires either a YES or NO vote, but not both. In order to be permitted to vote on the replacement candidate, the voter must either favor or oppose the recall, and have voted accordingly. This examination is performed by four flip-flops which temporarily store the existence of a recall question and the voting on the question. If from this analysis, it is determined that the recall vote is improper, an error mark is written in the B–8 cells of the next office, which assigned to the replacement candidates to indicate that these are not valid votes as defined by the Election Code. Following the pass through Column A, the column counter advances and the other columns are examined in sequence.

*P–13—Load inhibit vote update register.*—After the improper recall examination of Column D, the phase counter advances to P–13 and the column counter resets to P–A. Beginning with Column A an examination is made for any overvote or improper recall marks that have been recorded in B8 cells of the drum and any such marks are then transferred to a group of "U" flip-flops, each corresponding to one of the fifteen possible offices per column which here are termed an Inhibit Register. The proper flip-flop of this Register is gated by the "G" flip-flops now functioning as an Office Counter which counts the offices as the pass through Column A is made.

The completion of the loading of the Inhibit Register for Column A advances the phase counter to P-14 without affecting the column counter.

*P-14—Write inhibit marks.*—The completion of the loading of the Inhibit Register from Column A advances the phase counter to P-14, but the column counter remains at P-A. The inhibit marks stored in the Inhibit Register are now rewritten on the drum for each candidate for the office in the respective B-5 cells, under the control of the Office Counter so that each mark is limited to the "improperly" voted office. This operation results in an inhibit mark prior to each vote that is not to be counted into the total. At the completion of the operaion for Column A, the phase counter returns to P-13 and the column counter advances to P-B. The Inhibit Register is next loaded with the inhibit marks from Column B and these are subsequently rewritten. In a similar manner Columns C and D are processed. After Column D inhibit marks have been written on the drum, the counter goes to P-15.

*P-15—Update cumulative totals.*—After all columns have been adjusted so as to have the inhibit marks at the start of the offices, the phase counter advances to P-15 where the cumulative totals are to be increased for each candidate that received a valid vote from the last ballot. Under the control of the column counter, each column is processed in sequence.

During this phase, words in channels A-D that have no marks in the B5 cells add the contents of the B6 cell into the associated accumulator register of channels E-H.

*P-16—Add one to ballots fed.*—The updating of cumulative totals advances the phase counter to P-16 at which time the accumulator word on the magnetic drum, storing the number of ballots fed, is increased by one to represent that a good ballot has just been read and the totals updated. This total is maintained in the first word of the E channel, W1 which would otherwise correspond to the title block of the first elective office of channel A.

*P-17—Clear out old votes.*—After updating the number of ballots fed, the phase counter advances to P-17 and all of the old votes and inhibit marks are erased from cells B5, B6 and B8 of the short term storage of channels A-D on the magnetic drum. The remaining program information found in cells B1, B2 and B3 are not erased nor are the cumulative totals of channels E-H erased. This prepares the system for receiving the votes from the next ballot.

If a feed error had resulted when the ballot was fed, the pressing of the Reset Button on the control panel automatically advances the phase counter to P-17, and all of the data from the improperly inserted ballot is erased from the drum.

*P-18—Preset binary vote counter.*—After the old vote data has been cleared from the temporary drum storage, the phase counter advances to P-18. The number of ballots fed is taken from the accumulator register word W1 of channel E in binary form and is used to preset the Binary Vote Counter 208.

*P-19—Convert binary to decimal.*—Following the setting of the Binary Vote Counter 208, the phase counter advances to P-19. The Binary Vote Counter 208 is then pulsed to count down in synchronism with the Decimal Vote Counter 210 which counts up. Since the Decimal Counter starts at zero, it will contain the decimal number of ballots fed when the binary counter reaches zero.

From this phase count, the unit resets to the condition prior to the feeding of the last ballot, that is, it displays the number of ballots fed and waits for the next ballot to be inserted into the unit.

(III) *Vote read-out*

This operation includes phase counts P-20 through P-23. Upon completion of the processing of all ballots for a precinct, the totals can be obtained from the unit for each candidate or measure. This is accomplished by selecting a column with the phase selector switch 86 and framing a name by the Slider 98 and then pressing the Read-Out Button 84. The totals appear in the windows at the top of the unit.

*P-20—Wait.*—Following the processing of all ballots of a precinct, the changing of the Phase Selector Switch 86 from Read to the selection of one of the columns for read-out, advances the phase counter to P-20. In this phase count, the machine waits for the slider (which frames the name of one candidate) to be positioned and the Read-Out Button 84 pressed.

A printed form, preferably a ballot identical to the ballots being tabulated, is designated the Read-Out sheet 40" and is mounted on top of the unit under a clear plastic cover. The Read-Out sheet 40" is properly aligned so that the movable slider Bar 98 with the cut-out window 100 can frame the name of each candidate when moved to that position.

Read-Out of vote totals is accomplished by rotating the Phase Selector Switch 86 to the number corresponding to the column to be read from which illuminates an indicator light above the appropriate column of the Read-Out sheet. This light is intended to correspond the position of the control panel switch with the column being read from.

The Slider Bar 98 is then moved to frame the name of a candidate.

*P-21—Preset binary vote counter.*—The pressing of the Read-Out Button 84 advances the phase counter to P-21.

From the six switches 102, on the Slider Bar 98, a "code pattern" is generated that addresses one word on the drum in which the vote total for the corresponding candidate has been stored. This code combination forces the Ballot Timing Counter 196 to the proper address. Agreement between this counter and the Word Counter 194 causes generation of a signal that gates data from the drum into the Binary Vote Counter 208.

*P-22—Convert binary to decimal.*—With the advance of the phase counter to P-22 the Binary Vote Counter is counted down while a Decimal Vote Counter is counted up. Each counter is activated by the system clock pulse. Since the Decimal Counter starts at zero and continues counting until the Binary Counter reaches zero at that time the Decimal Counter will contain the correct number of votes.

*P-23—Display vote totals.*—When the Binary Vote Counter 208 reaches a value of zero, the phase counter is advanced on the next clock pulse to P-23 and counting is stopped. The number in the accumulator is converted from pure binary to four bit binary-coded-decimal format with bits having weights of $2^3$, $2^2$, $2^1$ and $2^0$.

From the binary-coded-decimal format, a one-of-ten selection is made. Each of these ten outputs is coupled through a power amplifier to present a display of the proper digit in the display windows 88.

Although many displays are available, in the preferred embodiment, a lens and mask system projects a digit on a screen corresponding to the activated one of a plurality of light sources.

This number is displayed as long as desired; that is, until the Read-Out Button is released and another candidate's vote totals are commanded to be read-out.

After the recording of the precinct vote of a candidate in a suitable permanent record, release of the Read-Out Button causes the phase counter to reset to P-20 from P-23. At this time the machine waits for the selection of a next candidate's name and pressing of the Read-Out Button 84.

The foregoing description of the various phase operations may now be reviewed in conjunction with the operation of the instant invention. In FIG. 21, there is shown in several lines, an idealized schematic of the contents of a portion of the drum, during various parts of the machine's operating cycle. Line 1 corresponds the individual words of drum channel A, for example, with the lines of a typical ballot. As shown, word W20 of channel A corresponds to Office 3, for example, followed by words associated with the voting squares of candidate X, candidate Y, candidate Z, and the space provided for a write-in candidate, respectively. Word W25 is associated with Proposition No. 1, and words W26 and W27 are associated with the YES and NO votes, respectively, for Proposition No. 1.

In line 2, the contents of a portion of channel A are shown immediately after the programming phases have been completed. The presence of marks is indicated by a "1" and the absence of a mark is indicated by a "0" or a blank. As will be noted, each B9 cell has a mark, represented by a "1" stored therein for error detection purposes. As was mentioned above, during the programming phases, 49 "1's" are written into B9 cells and a single "0" is written into a 50th B9 cell of channel A. By examining the B9 cell of each word, during later operations, a loss in synchronism may be detected, either by the absence of a "1" at the time corresponding to the appearance of a B9 cell at the read head, or by the absence of a "0" in the B9 cell of the proper word. Either circumstance, when detected, can provide a suitable error signal.

Referring again to line 2, the situation illustrated therein is one in which Office No. 3 has three candidates, "X," "Y," and "Z" listed on the ballot, as well as a write-in space for a fourth candidate. Further, Office No. 3 is one in which votes may be cast for as many as two candidates. Proposition No. 1, on the other hand, may be voted either YES or NO, but not both. The proper programming marks for the above-described situation are shown. In words W21, W22, W23 and W24, a mark is found in each of the B1 cells indicating a permissible voting location and, in words W21 and W22, marks are placed in the B2 cells as well, indicating a permissible vote for two candidates. In the words corresponding to Proposition No. 1, a mark is placed in the B1 cells of both words W26 and W27, indicating permissible locations, but a mark is placed in the B2 cell of word W26 only, to indicate that only one vote is proper.

Line 3 represents the same portion of the drum channel after the ballot reading operation has been completed and the contents of the ballot have been transferred into the memory. For ease in reader-understanding, the "new" information added to a particular line is shown in solid lines, while the information carried forward from a previous line is shown in dotted lines. In line 3, therefore, a "new" mark is placed in the B6 cells of words W21, W24, W26 and W27, representing marks placed on the ballot by the voter, and which are detected and "read'" into the machine. Inasmuch as two votes for candidates are permitted for Office No. 3, the voting there has been proper. However, in this example, the voter has incorrectly marked both the "YES" and "NO" squares of Proposition No. 1, which is an improper vote and must be disregarded.

As explained above, during the overvote computation phase, P-11 the voting marks in the B6 cells are examined, and at line 4, the result of such examination is, in the case of Proposition No. 1, the placing of a mark in the B8 cell of word W27 which indicates that the vote for "NO" after a vote for "YES" is improper.

On line 5, there is shown the placement of "inhibit" marks in the B5 cells of words W26 and W27 which will prevent the entry of the votes for Proposition No. 1 into the corresponding accumulator registers of channel E. Line 6 shows, a portion of channel E and words W20 through W27 in alignment with words W20 through W27 of channel A. However, the totals for candidate "X," whose votes are stored in word W21 of channel A, are accumulated in word W22 of channel E. Similarly, all other candidates' accumulated totals are stored in the next word of the accumulator channels.

The vote represented by the mark in the B6 cell of word W21 is therefore added into the B0 cell of word W22 of channel E, the vote for the write-in candidate, represented by the mark in the B6 cell of word W24 is entered in the B0 cell of word W25 of the E channel, and the presence of the "inhibit" mark in the B5 cells of words W26 and W27 prevent the entry of the marks in words W26 and W27 into the corresponding words of the E channel, W27 and W28, respectively.

Set out below, are a plurality of logical expressions which identify electrical signals, and opposite each is the "meaning" ascribed to it. These symbols are later used in the various logical equations that define the operation of the actual physical circuits of the preferred embodiment.

(1) CP1=clock
(2) CP2=clock·$\overline{Q04}$ (no feed error)
(3) CP3=$\overline{\text{clock}}$
(4) CP4=$\overline{\text{clock}}$ In the first group of symbols are the Clock Pulse functions, CP1 through CP4 (definitions 1 through 4). Definitions 5 through 13, below, correspond to the various Drum Read flip-flops, each from a different channel on the drum.

(5) DAR=Drum Read A Flip-Flop 190A—Register A
(6) DBR=Drum Read B Flip-Flop 190B—Register B
(7) DCR=Drum Read C Flip-Flop 190C—Register C
(8) DDR=Drum Read D Flip-Flop 190D—Register D
(9) DER=Drum Read E Flip-Flop 190E—Register E
(10) DFR=Drum Read F Flip-Flop 190F—Register F
(11) DGR=Drum Read G Flip-Flop 190G—Register G
(12) DHR=Drum Read H Flip-Flop 190H—Register H
(13) DPR=Drum Read P Flip-Flop 190P—Register P
(14) K2=Control Relay
(15) MA1; MA2=Scanner Photodiode Amplifiers Output—Column A
(16) MB1; MB2=Scanner Photodiode Amplifiers Output—Column B
(17) MC1; MC2=Scanner Photodiode Amplifiers Output—Column C
(18) MD1; MD2=Scanner Photodiode Amplifiers Output—Column D
(19) MT4=Scanner Photodiode Amplifier — Timing Track
(20) PB1=Feed Error Rest Push Button 78
(21) PB2=Read Pushbutton 84
(22) SK1=Ballot Length Selector Setting for 30 Rows
(23) SK2=Ballot Length Selector Setting for 40 Rows
(24) SK3=Ballot Length Selector Setting for 50 Rows
(25) SM1=Phase Selector Switch 86—Setting Program
(26) SM2=Phase Selector Switch 86—Feed Ballots
(27) SMA=Phase Selector Switch 86—Read-out Column A
(28) SMB=Phase Selector Switch 86—Read-out Column B
(29) SMC=Phase Selector Switch 86—Read-out Column C
(30) SMD=Phase Selector Switch 86—Read-out Column D
(31) SR1=Read-out Decode Switch 102—#1
(32) SR2=Read-out Decode Switch 102—#2
(33) SR3=Read-out Decode Switch 102—#3
(34) SR4=Read-out Decode Switch 102—#4
(35) SR5=Read-out Decode Switch 102—#5
(36) SR6=Read-out Decode Switch 102—#6
(37) SX=Ballot Feed Switch 146—Left
(38) SY=Ballot Feed Switch 148—Right
(39) SZ=Ballot Feed Switch 150—Read Station Definitions 14 through 39, above, identify other sources of signals such as photodiodes in the scanning heads, push buttons, or other switches.

The equations that enable the various circuit elements have also been set out below, and included among these equations, are the triggering equations for the "one-shot," or monostable multivibrators, "flip-flops" or bistable multivibrators, and most of the complex logical expressions that are carried throughout the system as composite functions of various sources of signals. Each equation has been numbered separately and, where feasible, similar circuits have been grouped together.

The first group of equations, 1 through 4, below, are the triggering equations for a set of monostable multivibrators or "one-shot" circuits (not otherwise shown) which are triggered, at the first instance, by the recognition of a mark by the timing track scanning head and the simultaneous indication of the presence of a ballot at the reading stations. As indicated in the equations, each single shot is triggered by the output of a prior device in the group, as indicated by Equation 1. The remaining "one-shots," SS3, SS4 and SS1 are, as indicated by Equations 2 through 4, triggered by the output of the prior unit.

(1) $S\ SS2 = Q18\ Q17$
(2) $S\ SS3 = SS2$
(3) $S\ SS4 = SS3$
(4) $S\ SS1 = SS4$

Equations 5 through 12 are the setting and zeroing equations for a group of four "B" flip-flops (BF1–BF4), (not otherwise shown) that are interconnected and function as the Bit Counter 192. Equations 5, 7, 9 and 11 are the setting equations for the four flip-flops, respectively, and Equations 6, 8, 10 and 12 are the corresponding zeroing equations. The outputs of these four flip-flops are connected together through gating logic to define a series of individual signals, each representing the occurrence of a different bit of a word, as represented by Equations 13 through 22 corresponding, respectively, to the logical conditions defining bits B0 through B9 of each drum word.

(5) $SBF1 = \overline{BF1}\ CP1$
(6) $ZBF1 = BF1\ CP1$ (7) $SBF2 = \overline{BF4}\ \overline{BF2}\ BF1$
(8) $ZBF2 = \overline{BF4}\ BF2\ BF1$ (9) $SBF3 = \overline{BF3}\ BF2$
(10) $ZBF3 = BF3\ BF2$

(11) $SBF4 = \overline{BF4}\ BF3$
(12) $ZBF4 = BF4\ BF1$

(13) $B0 = \overline{BF4}\ \overline{BF3}\ \overline{BF2}\ \overline{BF1}$
(14) $B1 = \overline{BF4}\ \overline{BF3}\ \overline{BF2}\ BF1$
(15) $B2 = \overline{BF3}\ BF2\ \overline{BF1}$
(16) $B3 = \overline{BF3}\ BF2\ BF1$
(17) $B4 = BF3\ \overline{BF2}\ \overline{BF1}$
(18) $B5 = BF3\ \overline{BF2}\ BF1$
(19) $B6 = BF3\ BF2\ \overline{BF1}$
(20) $B7 = BF3\ BF2\ BF1$
(21) $B8 = BF4\ \overline{BF1}$
(22) $B9 = BF4\ BF1$ Equations 23 through 30 define the logical conditions for setting and re-setting a group of four "M" flip-flops (MFA–MFD), (not otherwise shown) which temporarily store the outputs of the scanning heads for the four ballot columns. Equations 23, 25, 27 and 29 are the setting equations for the Mark Flip-Flops of the A, B, C and D columns, respectively, corresponding to the first, second, third and fourth columns of the ballot. Equations 24, 26, 28 and 30 are the zeroing equations for these same flip-flops.

(23) $S\ MFA = (MA1 + MA2)\ SS4\ CP1$
(24) $Z\ MFA = SS3\ CP1$
(25) $S\ MFB = (MB1 + MB2)\ SS4\ CP1$
(26) $Z\ MFB = SS3\ CP1$
(27) $S\ MFC = (MC1 + MC2)\ SS4\ CP1$
(28) $Z\ MFC = SS3\ CP1$
(29) $S\ MFD = (MD1 + MD2)\ SS4\ CP1$
(30) $Z\ MFD = SS3\ CP1$

The Phase Counter 222 of the present invention is a set of twenty-three interconnected flip-flops (P00–P23), which are energized in a serial fashion, although branch points are provided. Further, four subsidiary flip-flops (PA–PD) are used to cycle through sub-routines which are peculiar to each of the temporary storage channels of the drum. Equations 31 through 78 set out the equations for each of these phase flip-flops, and Equations 79 through 86 are the equations controlling the subsidiary flip-flops. As before, the odd-numbered equations are the setting functions, while the even-numbered equations represent the zeroing functions. The phase flip-flops are arranged as a "ring counter" so that only one of the flip-flops is in its Set state at any given time. In this fashion, the Phase state of the system, described in detail above, is uniquely defined.

(31) $S\ P00 = Q01\ CP2$
(32) $Z\ P00 = S\ P01$

(33) $S\ P01 = P00\ \overline{Q01}\ CP2$
(34) $Z\ P01 = S\ P02 + Q01$

(35) $S\ P02 = P01\ PC\ AT35\ \overline{SZ}\ CP2$
(36) $Z\ P02 = S\ P03 + Q01$

(37) $S\ P03 = P02\ PC\ AT35\ \overline{SZ}\ CP2$
(38) $Z\ P03 = S\ P04 + Q01$

(39) $S\ P04 = P03\ PC\ AT35\ \overline{SZ}\ CP2$
(40) $Z\ P04 = S\ P05 + Q01$

(41) $S\ P05 = P04\ PC\ AT35\ \overline{SZ}\ CP2$
(42) $Z\ P05 = S\ P06 + Q01$

(43) $S\ P06 = P05\ PC\ AT35\ \overline{SZ}\ CP2$
(44) $Z\ P06 = S\ P07 + Q01$

(45) $S\ P07 = P06\ PC\ AT35\ \overline{SZ}\ CP2$
(46) $Z\ P07 = P08\ CP2 + Q01$

(47) $S\ P08 = P07\ SM2\ \overline{Q03}\ CP2$ $\phantom{S\ P08 =}+ P19\ \overline{Q03}\ Q08\ HF1\ HF2\ HF3\ HF4\ GF1\ GF2\ GF3\ GF4\ CP2$
(48) $Z\ P08 = (P09 + P20)\ CP2 + Q01$

(49) $S\ P09 = P08\ \overline{SX}\ SY\ CP2$

(50) $Z\ P09 = (P09\ AT35\ \overline{SZ} + P17)\ CP2 + Q01$

(51) $S\ P10 = P09\ AT35\ \overline{SZ}\ CP2$
(52) $Z\ P01 = SP11 + Q01$
(53) $S\ P11 = P10\ W50\ B9\ CP2$
(54) $Z\ P11 = SP12 + Q01$
(55) $S\ P12 = P11\ PD\ W50\ B9\ CP2$
(56) $Z\ P12 = SP13 + Q01$

(57) $S\ P13 = (P12\ PD\ W50\ B9 + P14\ \overline{PD}\ W50\ B9)\ CP2$
(58) $Z\ P13 = SP14 + Q01$
(59) $S\ P14 = P13\ W50\ B9\ CP2$
(60) $Z\ P14 = P14\ W50\ B9\ CP2 + Q01$

(61) S P15=P14 PD W50 B9 CP2
(62) Z P15=SP16+Q01
(63) S P15=P15 PD W50 B9 CP2
(64) Z P16=SP17+Q01
(65) S P17=P16 W50 B9 CP2+P09Q13W50B9CP2
(66) Z P17=SP18+Q01
(67) S P18=P17 W50 B9 CP2
(68) Z P18=SP19+Q01
(69) S P19=P18 W50 B9 CP2
(70) Z P19=SP08+Q01

(71) S P20=(P21+P22+P23+SMA+SMB+SMC+SMD) $\overline{PB2}$ CP2
(72) Z P20=SP21+Q01
(73) S P21=P20 PB2 W50 B9 CP2

(74) Z P21=(P21 W50 B9+$\overline{PB2}$) CP2+Q01
(75) S P22=P21 W50 B9 CP2

(76) Z P22=SP23+$\overline{PB2}$ CP2+Q01

(77) S P23=P22 $\overline{Q03}$ Q08 HF1 HF2 HF3 HF4 GF1 GF2 GF3 GF4 CP2
(78) Z P23=P20 CP2+Q01

(79) S PA=[(P01+P02+P03+P04+P05) PC AT35 $\overline{SZ}$
    +$\overline{P09}$ Q13+P10 W50 B9
    +(P11+P12+P14) PD W50 B9+P00] CP3
(80) Z PA=PB CP3+Q01
(81) S PB=[(P01+P02+P03+P04+P05+P06) PA SX SY
    +(P11+P12+P13+P14) PA W50 B9
    +Q04] CP3

(82) Z PB=[(P01+P02) $\overline{MFA}$ MFB $\overline{MFC}$ MFD PB SS4
    +(P03+P04) MFA $\overline{MFB}$ MFC $\overline{MFD}$ PB SS4
    +(P05+P06) $\overline{MFA}$ $\overline{MFB}$ MFC MFD PB SS4
    +(P11+P12+P15+P14) PB W50 B9
    +Q13] CP3+Q01

(83) S PC=[(P01+P02) $\overline{MFA}$ MFB $\overline{MFC}$ MFD PB SS4
    +(P03+P04) MFA $\overline{MFB}$ MFC $\overline{MFD}$ PB SS4
    +(P05+P06) $\overline{MFA}$ $\overline{MFB}$ MFC MFD PB SS4
    +(P11+P12+P13+P14) PB W59 B9] CP3

(84) Z PC=[(P01+P02+P03+P04+P05+P06) PC AT35 $\overline{SZ}$
    +(P11+P12+P13+P14) PC W50 B9
    +Q13] CP3+Q01
(85) S PD=[(P01+P02+P03+P04+P05+P06) SS1
    +P09 SZ
    +(P11+P12+P13+P14) PC W50 B9] CP3
(86) Z PD=[(P01+P02+P03+P04+P05+P06) SS4
    +(P11+P12+P14) PD W50 B9
    +P10+P17] CP3+Q01

A group of "Q" flip-flops, designated Q01 through Q20 (not otherwise shown) are general-purpose flip-flops, having various functions, and Equations 87 through 126 represent the controlling equations for these miscellaneous flip-flops. While some of these flip-flops represent specific conditions, others are utilized for different tasks during different phases of the operation. The Q01 flip-flop serves as the system re-set and the Q01 output signal will be found in each of the zeroing equations for the phase flip-flops except P00 where it is present in the setting term.

(87) S Q01=($\overline{K2}$+K2 PB1) CP1

(88) Z Q01=K2 $\overline{PB1}$ CP1
(89) S Q02=W50 B9 CP1
(90) Z Q02=Q02 CP1

The Q02 flip-flop is used to re-set a group of flip-flops functioning as the word counter. The Q03 flip-flop signals a "program error," and is shown as Program Error flip-flop 206. A "feed error" is indicated by the Q04 flip-flop.

(91) S Q03=[P01 PA (DAR+DBR+DCR+DDR+DER+DFR+DGR+DHR)
    +Q20 $\overline{DPR}$+$\overline{Q20}$ DPR
    +$\overline{P00}$ $\overline{P01}$ B9 ($\overline{W02}$ DAR+W02 $\overline{DAR}$)
    +(P01 $\overline{PA}$+P02+P03+P04+P05+P06) $\overline{SM1}$
    +(P09+P10+P11+P12+P13+P14+P15) $\overline{SM2}$
    +(P20+P21+P22+P23) $\overline{SX}$
    +(P02+P04+P06) PC (SS1+$\overline{Q19}$)
      ·(TF1+TF2+TF3+TF4+TF5+TF6)
    ·(MFA $\overline{Q09}$+$\overline{MFA}$ Q09+MFB $\overline{Q10}$+$\overline{MFB}$ Q10
    +MFC $\overline{Q11}$+$\overline{MFC}$ Q11+MFD $\overline{Q12}$+$\overline{MFD}$ Q12)] CP1
(92) Z Q03=P00 CP1+Q01

(93) S Q04=[P09 PD $\overline{AT35}$ $\overline{SZ}$
    +(P01+P02) PB PD $\overline{MFA}$ $\overline{MFB}$ $\overline{MFC}$ $\overline{MFD}$
    +(P03+P04) PB PD MFA $\overline{MFB}$ MFC $\overline{MFD}$
    +(P05+P06) PB PD $\overline{MFA}$ $\overline{MFB}$ MFC MFD
    +SX $\overline{SY}$] CP1
(94) Z Q04=Q13 CP1+Q01

During the computing phases, P11 through P15, the Q05 flip-flop stores a bit during each word corresponding to the proper vote locations, while the Q06 flip-flop staticizes the presence of a proper location during phase P12 which computes improper recall voting and, during P15, staticizes the marks corresponding to the stored vote mark.

(95) S Q05=[(P11+P13+P14+P15) B1+P12 B3]
    ·[PA $\overline{DAR}$+PB $\overline{DBR}$+PC $\overline{DCR}$+PD $\overline{DDR}$] CP2
(96) Z Q05=[(P11+P12+P13+P14+P15) B1
    ·(PA $\overline{DAR}$+PB $\overline{DBR}$+PC $\overline{DCR}$+PD $\overline{DDR}$)
    +W50 B9] CP2
(97) S Q06=[P12 B1 Q05 (PA $\overline{DAR}$+PB DBR
    +PC DCR+PD DDR)
    +P15 B6 Q05 (PA DAR $\overline{DAW}$+PB DBR $\overline{DBW}$
    +PC DCR $\overline{DCW}$+PD DDR $\overline{DDW}$)] CP2

(98) Z Q06=[P12 B1 Q07 (PA $\overline{DAR}$+PB $\overline{DBR}$
    + PC $\overline{DCR}$+PD $\overline{DDR}$)
    +P15 B0] CP2

Q07 functions as a carry flip-flop during phases 15 and 16 and, during P12, stores permissible vote locations. Q08 is set by the first vote in a permissible location and is re-set if a second vote is cast. Since the question of the recall is either YES or NO, no other votes would be recorded to re-set the flip-flop. The Q08 flip-flop is also used for the binary-to-decimal conversion during phases P18 through P21.

(99) S Q07=[P12 B1 Q06 (PA DAR+PB DBR
                    +PC DCR+PD DDR)
       +P15 B9 $\overline{Q06}$+P16 W01 B9] CP2

(100) Z Q07=[P12 B1 (PA $\overline{DAR}$+PB $\overline{DBR}$+PC $\overline{DCR}$+PD $\overline{DDR}$)
            +P13
       +{(P15 PA $\overline{W01}$+P15 PB W01+P16 W02) $\overline{DER}$
         +(P15 PB $\overline{W01}$+P15 PC W01) $\overline{DFR}$
         +(P15 PC $\overline{W01}$+P15 PD W01) $\overline{DGR}$
         +(P15 PD $\overline{W01}$+P16 W01) $\overline{DHR}$}
       ·(P15 B9 $\overline{Q06}$) (P16 W01 B9)
       +P16 $\overline{DER}$ $\overline{P16}$ $\overline{W01}$ $\overline{B9}$] CP2

(101) S Q08=[P12 B6 Q05 $\overline{Q08}$ (PA DAR+PB DBR
                    +PC DCR+PD DDR)
       +P18 W02 B1 DER
       +(P19+P20) Q14 $\overline{Q08}$
       +P21 AT41 B1 (SMA DER+SMB DFR
                    +SMC DGR+SMD DHR)] CP2

(102) Z Q08=[P12 B6 Q05 Q08 (PA DAR+PB D B R
                    +PC DCR+PD DDR)
       +P12 B1 Q07 (PA $\overline{DAR}$+PB $\overline{DBR}$
                    +PC $\overline{DCR}$+PD $\overline{DDR}$)
       +(P19+P22) Q14 Q08
       +P11+P17+P20] CP2

The Q09 through Q12 flip-flops store information from the four channels of the drum, respectively, for comparison purposes with the programming sheet.

(103) S Q09=(P02 B1+P04 B2+P06 B3) PC AT41 $\overline{SS3}$ DAR
(104) Z Q09=(P02+P04+P06) PC SS3

(105) S Q10=(P02 B1+P04 B2+P06 B3) PC AT41 $\overline{SS3}$ DBR
(106) Z Q10=(P02+P04+P06) PC SS3

(107) S Q11=(P02 B1+P04 B2+P06 B3) PC AT41 $\overline{SS3}$ DCR (108) Z Q11=(P02+P04+P06) PC SS3

(109) S Q12=(P02 B1+P04 B2+P06 B3) PC AT41 $\overline{SS3}$ DDR
(110) Z Q12=(P02+P04+P06) PC SS3

The Q13 flip-flop is used to re-start operation after a Feed Error has been detected and is controlled by the appropriate push button.

(111) S Q13=PB1 CP3
(112) Z Q13=$\overline{PB1}$ $\overline{Q04}$ CP3

The Q14 flip-flop is used in the over-vote computation, the improper recall computation (phases P11, P12, respectively), and also during the binary-to-decimal conversion, phases P18 through P22.

(113) S Q14=[P11 B6 Q05 (HF4 GF4+$\overline{HF4}$ $\overline{GF4}$)
       (HF3 GF3+$\overline{HF3}$ $\overline{GF3}$) (HF2 GF2+$\overline{HF2}$ $\overline{GF2}$)
       (HF1 GF1+$\overline{HF1}$ $\overline{GF1}$) (PA DAR+PB DBR
                    +PC DCR+PD DDR)
       +P12 Q05 $\overline{Q08}$ B1 (PA $\overline{DAR}$+PB $\overline{DBR}$
                    +PC $\overline{DCR}$+PD $\overline{DDR}$)
       +P18 W02 B0 DER
       +P21 AT41 B0 (SMA DER+SMB DFR
                    +SMC DGR+SMD DHR)
       +(P19+P22) $\overline{Q14}$] CP3

(114) Z Q14=[P11 B1 (PA $\overline{DAR}$+PB $\overline{DBR}$+PC $\overline{DCR}$+PC $\overline{DDR}$)
       +P12 B1 Q07 (PA $\overline{DAR}$+PB $\overline{DBR}$
                    +PC $\overline{DCR}$+PD $\overline{DDR}$)
       +(P19+P22) Q14
       +P17+P20] CP3

The Q15 flip-flop functions as a driver, during phases P11 and P19 or P22 to step a "vote counter" which is comprised of a bank of four "H" flip-flops (not otherwise shown). Similarly, the Q16 flip-flop is used to drive a permissible "vote counter" which is comprised of a group of four "G" flip-flops (not otherwise shown).

(115) S Q15=[P11 B6 (PA DAR+PB DBR+PC DBR+PD DDR)
            +(P19+P22) Q 08 Q14] CP3
(116) Z Q15=Q15 CP3

(117) S Q16=$\overline{Z\ Q16}$ CP3
(118) Z Q16=(P19+P22) HF4 H F3 HF2 HF1 Q08 Q14 Q16 CP3

The actual scanning of the ballot is controlled, in part, by the Q17, Q18 and Q19 flip-flops. The third of the snap action switches, $S_Z$ controls the Q17 flip-flop which staticizes the state of the switch. The Q18 flip-flop staticizes a mark from the timing track on the ballot and Q19 staticizes the "one-shot" SS1.

(119) S Q17=SZ CP1
(120) Z Q17=$\overline{SZ}$ $\overline{SY}$ CP1
(121) S Q18=MT4 CP1
(122) Z Q18=$\overline{MT4}$ $\overline{SS4}$ CP1
(123) S Q19=SS1 CP1
(124) Z Q19=$\overline{SS1}$ Q19 CP1

The Q20 flip-flop is a Parity Error flip-flop and is set whenever the Parity is in fact incorrect.

(125) S Q20=[(DAR $\overline{DBR}$+$\overline{DAR}$ DBR) (DCR $\overline{DDR}$+$\overline{DCR}$ DDR)
            +(DAR $\overline{DBR}$+$\overline{DAR}$ DBR)(DCR $\overline{DDR}$+$\overline{DCR}$ DDR)]
       ·[(DER $\overline{DFR}$+$\overline{DER}$ DFR)(DGR $\overline{DHR}$+$\overline{DGR}$ DHR)
            +(DER $\overline{DFR}$+$\overline{DER}$ DFR)(DGR $\overline{DHR}$+$\overline{DER}$ DHR)] CP1
       +[(DAR $\overline{DBR}$+$\overline{DAR}$ DBR)(DCR $\overline{DDR}$+$\overline{DCR}$ DDR)
            +(DAR $\overline{DBR}$+$\overline{DAR}$ DBR)(DCR $\overline{DDR}$+$\overline{DCR}$ DDR)]
       ·[(DER $\overline{DFR}$+$\overline{DER}$ DFR)(DGR $\overline{DHR}$+$\overline{DGR}$ DHR)
            +(DER $\overline{DFR}$+$\overline{DER}$ DFR)(DGR $\overline{DHR}$+$\overline{DGR}$ DHR)] CP1

(126) Z Q20=$\overline{S\ Q20}$ CP1

A group of six "T" flip-flops, TF1–TF6 (not otherwise shown), are interconnected together to form a counter which functions as the Ballot timing Counter 196 to identify information being read from the ballot. Equations 127 through 138 are the setting and zeroing equations for these six "T" flip-flops.

(127) S TF1=(PC+P09) SS4 $\overline{TF1}$
      +P21 PB2 SR1
(128) Z TF1=(PC+P09) SS4 TF1
      +PB+P08+P21 PB2 $\overline{SR1}$
(129) S TF2=TF1 $\overline{TF2}$+P21 PB2 SR2
(130) Z TF2=TF1 TF2+PB+P08+P21 PB2 $\overline{SR2}$
(131) S TF3=TF2 $\overline{TF3}$+P21 PB2 SR3
(132) Z TF3=TF2 TF3+PB+P08+P21 PB2 $\overline{SR3}$
(133) S TF4=TF3 $\overline{TF4}$+P21 PB2 SR4
(134) Z TF4=TF3 TF4+PB+P08+P21 PB2 $\overline{SR4}$
(135) S TF5=TF4 $\overline{TF5}$+P21 PB2 SR5
(136) Z TF5=TF4 TF5+PB+P08+P21 PB2 $\overline{SR5}$
(137) S TF6=TF5 $\overline{TF6}$+P21 PB2 SR6
(138) Z TF6=TF5 TF6+PB+P08+P21 PB2 $\overline{SR6}$ A second group of six "W" flip-flops, WF1–WF6 (not otherwise shown), have been connected together to act as the Word Counter 194 to indicate the "word" being recognized from the drum. As will be noted, the Word Counter is triggered by the overflow from the Bit Counter described above. Equations 139 through 150 are the setting and zeroing equations for each of the six "W" flip-flops.

During operation, only three particular drum words need be recognized, the first and second words of each drum turn, W01 and W02, and the last word of any cycle W50. The equations defining these signals are set out as Equations 151 through 153, respectively.

(139) S WF1=BF4 $\overline{WF1}$
(140) Z WF1=BF4 WF1
(141) S WF2=WF1 $\overline{WF2}$
(142) Z WF2=WF1 WF2+Q02
(143) S WF3=WF2 $\overline{WF3}$
(144) Z WF3=WF2 WF3+Q02
(145) S WF4=WF3 $\overline{WF4}$
(146) Z WF4=WF3 WF4+Q02
(147) S WF5=WF4 $\overline{WF5}$
(148) Z WF5=WF4 WF5+Q02
(149) S WF6=WF5 $\overline{WF6}$
(150) Z WF6=WF5 WF6+Q02
(151) W01=$\overline{WF6}$ $\overline{WF5}$ $\overline{WF4}$ $\overline{WF3}$ $\overline{WF2}$ WF1
(152) W02=$\overline{WF6}$ $\overline{WF5}$ $\overline{WF4}$ $\overline{WF3}$ WF2 $\overline{WF1}$
(153) W50=WF $\overline{WF5}$ $\overline{WF4}$ $\overline{WF3}$ WF2 $\overline{WF1}$ A special signal, designated AT35 is generated when the state of the Ballot Timing Counter represents a count corresponding to the setting of the ballot length switch SK (not shown). As indicated in Equation 154, below, a count corresponding to 30, 40 or 50, will produce a signal if the ballot selector switch has been set to a position corresponding to the appropriate count.

(154) AT35=TF6 TF5 $\overline{TF4}$ $\overline{TF3}$ TF2 $\overline{TF1}$ SK3
      +TF6 $\overline{TF5}$ TF4 $\overline{TF3}$ $\overline{TF2}$ $\overline{TF1}$ SK2
      +$\overline{TF6}$ TF5 TF4 TF3 TF2 $\overline{TF1}$ SK1

A second composite function, AT41, also indicates an identity this time between the count in the Ballot Timing Counter 196 and the Word Counter 194 and, as indicated in Equation 155, below, a signal is provided whenever the counts are identical.

(155) AT41=(WF1 TF1+$\overline{WF1}$ $\overline{TF1}$) (WF2 TF2+$\overline{WF2}$ $\overline{TF2}$)
      ·(WF3 TF3+$\overline{WF3}$ $\overline{TF3}$) (WF4 TF4+$\overline{WF4}$ $\overline{TF4}$)
      ·(WF5 TF5+$\overline{WF5}$ $\overline{TF5}$) (WF6 TF6+$\overline{WF6}$ $\overline{TF6}$)

Yet another composite function is designated AQ78 and, as defined in Equation 156, below, occurs to reset the Decimal Vote Counter if no overvotes have been detected in phase P11 or on the last bit of the last word of a drum turn, during phases P12, P13 and P14, or, upon the entry into either phase P17 or P20.

(156) AQ78=P11 $\overline{Q05}$+P17+P20+(P12+P13+P14) W50 B9

A set of four "G" flip-flops, GF1 through GF4 (not otherwise shown), is connected together as a counter. Equations 157 through 164, below, provide the setting and zeroing expressions for these flip-flops. As will be noted from the equations, this counter serves both to count the number of permissible voting locations in each office, and also is combined with other flip-flops to form the 10-stage Binary Counter, used in the binary-to-decimal conversion.

(157) S GF1=P11 B2 (PA DAR+PB DBR+PC DCR+PD DDR) $\overline{GF1}$
      +P13 Q05 $\overline{GF1}$+P14 Q05 $\overline{GF1}$+$\overline{Q16}$ $\overline{GF1}$
      +P18 W02 B6 $\overline{DER}$
      +P21 $\overline{AT40}$ B6 (SMA $\overline{DER}$+SMB $\overline{DFR}$
      +SMC $\overline{DGR}$+SMD $\overline{DHR}$)
(158) Z GF1=P11 B2 (PA DAR+PB DBR+PC DCR+PD DDR) GF1
      +P13 Q05 GF1+P14 Q05 GF1+$\overline{Q16}$ GF1
      +(P11+P12+P13+P14+P15) W50 B9
      +P11 $\overline{Q05}$+P17+P20+Q01
(159) S GF2=GF1 $\overline{GF2}$+P18 W02 B7 $\overline{DER}$
      +P21 $\overline{AT40}$ B7 (SMA $\overline{DER}$+SMB $\overline{DFR}$
      +SMC $\overline{DGR}$+SMD $\overline{DHR}$)
(160) Z GF2=GF1 GF2
      +(P11+P12+P13+P14+P15) W50 B9
      +P11 $\overline{Q05}$+P17+P20+Q01
(161) S GF3=GF2 $\overline{GF3}$+P18 W02 B8 $\overline{DER}$
      +P21 $\overline{AT40}$ B8 (SMA $\overline{DER}$+SMB $\overline{DFR}$
      +SMC $\overline{DGR}$+SMD $\overline{DHR}$
(162) Z GF3=GF2 GF3
      +(P11+P12+P13+P14+P15) W50 B9
      +P11 $\overline{Q05}$+P17+P20+Q01
(163) S GF4=GF3 $\overline{GF4}$+P18 W02 B9 $\overline{DER}$
      +P21 $\overline{AT40}$ B9 (SMA $\overline{DER}$+SMB $\overline{DFR}$
      +SMC $\overline{DGR}$+SMD $\overline{DHR}$)
(164) Z GF4=GF3 GF4
      +(P11+P12+P13+P14+P15) W50 B9
      +P11 $\overline{Q05}$+P17+P20+Q01

A second group of four "H" flip-flops, HF1 through HF4 (not otherwise shown), is described by Equations 165 through 172. The "H" flip-flops normally count the actual votes which are stored on the drum and set the Q15 flip-flop. In the binary-to-decimal conversions, the four "H" flip-flops also form part of the 10-stage Binary Counter that stores the contents of an accumulator word from the drum.

(165) S HF1 = Q15 $\overline{HF1}$+P18 W02 B2 $\overline{DER}$ (166) Z HF1 = Q15 HF1+(P11+P12+P13+P14+P15) W50 B9
+P21 $\overline{AT40}$ B2 (SMA $\overline{DER}$+SMB $\overline{DFR}$+SMC $\overline{DGR}$+SMD $\overline{DHR}$)
+P11 $\overline{Q05}$+P17+P20+Q01

(167) S HF2 = HF1 $\overline{HF2}$+P18 W02 B3 $\overline{DER}$ (168) Z HF2 = HF1 HF2+(P11+P12+P13+P14+P15) W50 B9
+P21 $\overline{AT40}$ B3 (SMA $\overline{DER}$+SMB $\overline{DFR}$+SMC $\overline{DGR}$+SMD $\overline{DHR}$)
+P11 $\overline{Q05}$+P17+P20+Q01

(169) S HF3 = HF2 $\overline{HF3}$+P18 W02 B4 $\overline{DER}$ (170) Z HF3 = HF2 HF3+(P11+P12+P13+P14+P15) W05 B9
+P21 $\overline{AT40}$ B4 (SMA $\overline{DER}$+SMB $\overline{DFR}$+SMC $\overline{DGR}$+SMD $\overline{DHR}$)
+P11 $\overline{Q05}$+P17+P20+Q01

(171) S HF4 = HF3 $\overline{HF4}$+P18 W02 B5 $\overline{DER}$ (172) Z HF4 = HF3 HF4+(P11+P12+P13+P14+P15) W50 B9
+P21 $\overline{AT40}$ B5 (SMA $\overline{DER}$+SMB $\overline{DFR}$+SMC $\overline{DGR}$+SMD $\overline{DHR}$)
+P11 $\overline{Q05}$+P17+P20+Q01

A group of twelve "N" flip-flops (not otherwise shown) are interconnected in three "decades" to drive a gating network which selects the individual digits that are displayed on the Read Out Display 90. The "N" flip-flops are arranged in three groups of four, designated NF11 through NF14, NF21 through NF24, and NF31 through NF34, where the first digit refers to the "decade" and the second digit refers to a flip-flop within the "decade." Equations 173 through 196, below, set forth the setting and zeroing functions for each of these flip-flops.

(173) S NF11 = (P19+P22) (Q003+$\overline{Q14}$+$\overline{Q08}$+$\overline{HF1}$+$\overline{HF2}$
+$\overline{HF3}$+$\overline{HF4}$+$\overline{GF1}$+$\overline{GF2}$+$\overline{GF3}$+$\overline{GF4}$) $\overline{NF11}$ CP1

(174) Z NF11 = (P19+P22) (Q03+$\overline{Q14}$+$\overline{Q08}$+$\overline{HF1}$+$\overline{HF2}$
+$\overline{HF3}$+$\overline{HF4}$+$\overline{GF1}$+$\overline{GF2}$+$\overline{GF3}$+$\overline{GF4}$) NF11 CP1
+AQ78

(175) S NF12 = NF11 $\overline{NF14}$ $\overline{NF12}$
(176) Z NF12 = NF11 $\overline{NF14}$ NF12+AQ78
(177) S NF13 = NF12 $\overline{NF13}$
(178) Z NF13 = NF12 NF13+AQ78
(179) S NF14 = NF13 $\overline{NF14}$
(180) Z NF14 = NF11 NF14+AQ78
(181) S NF21 = NF14 $\overline{NF21}$
(182) Z NF11 = NF14 NF21+AQ78
(183) S NF22 = NF21 $\overline{NF24}$ $\overline{NF22}$
(184) Z NF22 = NF21 $\overline{NF24}$ NF22+AQ78
(185) S NF23 = NF22 $\overline{NF23}$
(186) Z NF23 = NF22 NF23+AQ78
(187) S NF24 = NF23 $\overline{NF24}$
(188) Z NF24 = NF21 NF24+AQ78
(189) S NF31 = NF24 $\overline{NF31}$
(190) Z NF31 = NF24 NF31+AQ78
(191) S NF32 = NF31 $\overline{NF34}$ $\overline{NF32}$
(192) Z NF32 = NF31 $\overline{NF34}$ NF32+AQ78
(193) S NF33 = NF32 $\overline{NF33}$
(194) Z NF33 = NF32 NF33+AQ78
(195) S NF34 = NF33 $\overline{NF34}$
(196) Z NF34 = NF31 NF34+AQ78

A set of fifteen "U" or update flip-flops, UF01–UF15 (not otherwise shown), are provided to record whether or not any of the fifteen offices in a column should not have its totals affected by the votes on a particular ballot. Each flip-flop is associated with a different office in a ballot column. The selection of each flip-flop is accomplished through the use of the "G" counter described above, as will appear from the following setting and zeroing Equations 197 through 226:

(197) S UF01 = P13 B8 (PA DAR+PB DBR+PC DCR+PD DDR)
.$\overline{GF4}$ $\overline{GF3}$ GF2 GF1
(198) Z UF01 = P13 W01 B1
(199) S UF02 = P13 B8 (PA DAR+PB DBR+PC DCR+PD DDR)
.$\overline{GF4}$ $\overline{GF3}$ GF2 $\overline{GF1}$ (200) Z UF02 = P13 W01 B1
(201) S UF03 = P13 B8 (PA DAR+PB DBR+PC DCR+PD DDR)
.$\overline{GF4}$ $\overline{GF3}$ GF2 GF1
(202) Z UF03 = P13 W01 B1
(203) S UF04 = P13 B8 (PA DAR+PB DBR+PC DCR+PD DDR)
.$\overline{GF4}$ GF3 $\overline{GF2}$ $\overline{GF1}$
(204) Z UF04 = P13 W01 B1
(205) S UF05 = P13 B8 (PA DAR+PB DBR+PC DCR+PD DDR)
.$\overline{GF4}$ GF3 $\overline{GF2}$ GF1
(206) Z UF05 = P13 W01 B1
(207) S UF06 = P13 B8 (PA DAR+PB DBR+PC DCR+PD DDR)
.$\overline{GF4}$ GF3 GF2 $\overline{GF1}$
(208) Z UF06 = P13 W01 B1
(209) S UF07 = P13 B8 (PA DAR+PB DBR+PC DCR+PD DDR)
.$\overline{GF4}$ GF3 GF2 GF1
(210) Z UF07 = P13 W01 B1
(211) S UF08 = P13 B8 (PA DAR+PB DBR+PC DCR+PD DDR)
.GF4 $\overline{GF3}$ $\overline{GF2}$ $\overline{GF1}$
(212) Z UF08 = P13 W01 B1
(213) S UF09 = P13 B8 (PA DAR+PB DBR+PC DCR+PD DDR)
.GF4 $\overline{GF3}$ $\overline{GF2}$ GF1
(214) Z UF09 = P13 W01 B1
(215) S UF10 = P13 B8 (PA DAR+PB DBR+PC DCR+PD DDR)
.GF4 $\overline{GF3}$ GF2 $\overline{GF1}$
(216) Z UF10 = P13 W01 B1
(217) S UF11 = P13 B8 (PA DAR+PB DBR+PCD CR+PD DDR)
.GF4 $\overline{GF3}$ GF2 GF1
(218) Z UF11 = P13 W01 B1
(219) S UF12 = P13 B8 (PA DAR+PB DBR+PC DCR+PD DDR)
.GF4 GF3 $\overline{GF2}$ $\overline{GF1}$
(220) Z UF12 = P13 W01 B1
(221) S UF13 = P13 B8 (PA DAR+PB DBR+PC DCR+PD DDR)
.GF4 GF3 $\overline{GF2}$ GF1
(222) Z UF13 = P13 W01 B1
(223) S UF14 = P13 B8 (PA DAR+PB DBR+PC DCR+PD DDR)
.GF4 GF3 GF2 $\overline{GF1}$
(224) Z UF14 = P13 W01 B1
(225) S UF15 = P13 B8 (PA DAR+PB DBR+PC DCR+PD DDR)
.GF4 GF3 GF2 GF1
226) Z UF15 = P13 W01 B1

Listed below are the setting and zeroing equations for the A–D Drum Write flip-flops, 184A–184D; for the E–H Drum Write flip-flops, 184E–184H; and for the P Drum Write flip-flop 184P, of the parity channel. The equations for the A–D Drum Write flip-flops, 184A–184D, are substantially similar, with a single term (227), in Equation 227 which writes a "1" in each B9 cell, except in word W02, during the initial programming phases.

To simplify the presentation of the equations, Equation 227 is used as a general setting equation for each of the A–D Drum Write flip-flops, 184A–184D, with the letter "X" representing the letter to be substituted to particularize the equation for each channel.

(227) S DXW=[B1 P01 PC AT41 MFX

+B1 $\overline{P01}$ PC AT41 $\overline{P00}$ DXR
+B2 P03 PC AT41 MFX

+B2 $\overline{P03}$ PC AT41 $\overline{P00}$ DXR
+B3 P05 PC AT41 MFX

+B3 $\overline{P05}$ PC AT41 $\overline{P00}$ DXR

+B4 $\overline{P00}$ DXR
+B5 P14 ($\overline{UF01}$ G01+$\overline{UF02}$ G02+ . . .
. . .+$\overline{UF14}$ G14+$\overline{UF15}$ G15) PX +B5 $\overline{P17}$ $\overline{P00}$ DXR
+B6 P09 AT41 MFX +B6 $\overline{P17}$ $\overline{P00}$ DXR +B7 $\overline{P00}$ DXR
+B8 P11 PX Q14+B8 P12 PX Q14

+B8 $\overline{P17}$ $\overline{P00}$ DXR (227')         +B9 P01 PB $\overline{W02}$ +B9 $\overline{P00}$ DXR ] CP1
(228) Z DXW=$\overline{S\ DXW}$ CP1

In a particular example, to zero the Write flip-flop for channel A, Equation 228 would be written:

Z DAW=$\overline{S\ DAW}$ CP1.

Since the setting and zeroing equations of the E–H and P Drum Write flip-flops, 184E–184H, 184P are less complex and more individualized, they have been set out as Equations 229 through 238, below, without a general term.

(229) S DEW=[(P15 PA $\overline{W01}$+P15 PB W01+P16 W02)

·(Q07 $\overline{DER}$+$\overline{Q07}$ $\overline{DER}$)

+$\overline{(P15\ PA\ \overline{W01}+P15\ PB\ W01+P16\ W02)}$ $\overline{P00}$ DER] CP1

(230) Z DEW=$\overline{S\ DEW}$ CP1

(231) S DFW=[(P15 PB $\overline{W01}$+P15 PC W01)

·(Q07 $\overline{DFR}$+$\overline{Q07}$ DFR)

+$\overline{(P15\ PB\ \overline{W01}+P15\ PC\ \overline{W01})}$ $\overline{P00}$ DFR] CP1

(232) Z DFW=$\overline{S\ DFW}$ CP1

(233) S DGW=[(P15 PC $\overline{W01}$+P15 PD W01)

·(Q07 $\overline{DGR}$+$\overline{Q07}$ DGR)

+$\overline{(P15\ PC\ \overline{W01}+P15\ PD\ W01)}$ $\overline{P00}$ DGR] CP1

(234) Z DGW=$\overline{S\ DGW}$ CP1

(235) S DHW=[(P15 PD $\overline{W01}$+P16 W01)

·(Q07 $\overline{DHR}$+$\overline{Q07}$ DHR)

+$\overline{(P15\ PD\ \overline{W01}+P16\ W01)}$ $\overline{P00}$ DHR] CP1

(236) Z DHW=$\overline{S\ DHW}$ CP1
(237) S DPW=[(DAW $\overline{DBW}$+$\overline{DAW}$ DBW) (DCW $\overline{DDW}$+$\overline{DCW}$ DDW)

+$\overline{(DAW\ \overline{DBW}+\overline{DAW}\ DBW)\ (DCW\ \overline{DDW}+\overline{DCW}\ DDW)}$]

·[(DEW $\overline{DFW}$+$\overline{DEW}$ DFW) (DGW $\overline{DHW}$+$\overline{DGW}$ DHW)

+$\overline{(DEW\ \overline{DFW}+\overline{DEW}\ DFW)\ (DGW\ \overline{DHW}+\overline{DGW}\ DHW)}$] CP1

+[9(DAW $\overline{DBW}$+$\overline{DAW}$ DBW) (DCW $\overline{DDW}$+$\overline{DCW}$ DDW)

+$\overline{(DAW\ \overline{DBW}+\overline{DAW}\ DBW)\ (DCW\ \overline{DDW}+\overline{DCW}\ DDW)}$]

·[(DEW $\overline{DFW}$+$\overline{DEW}$ DFW) (DGW $\overline{DHW}$+$\overline{DGW}$ DHW)

+$\overline{(DEW\ \overline{DFW}+\overline{DEW}\ DFW)\ (DGW\ \overline{DHW}+\overline{DGW}\ DHW)}$] CP1

(238) Z DPW=$\overline{S\ DPW}$ CP1

Table IV, set out below, identifies the logical state combination of the "G" flip-flops which correspond to counts, G01–G15, used in conjunction with Equation 227, above.

These states are the conventional binary counts of a counter in which GF1 holds the least significant digit.

TABLE IV

| | GF4 | GF3 | GF2 | GF1 |
|---|---|---|---|---|
| G01= | 0 | 0 | 0 | 1 |
| G02= | 0 | 0 | 0 | 0 |
| G03= | 0 | 0 | 1 | 1 |
| G04= | 0 | 0 | 1 | 0 |
| G05= | 0 | 1 | 0 | 1 |
| G06= | 0 | 1 | 0 | 0 |
| G07= | 0 | 1 | 1 | 1 |
| G08= | 0 | 1 | 1 | 0 |
| G09= | 1 | 0 | 0 | 1 |
| G10= | 1 | 0 | 0 | 0 |
| G11= | 1 | 0 | 1 | 1 |
| G12= | 1 | 0 | 1 | 0 |
| G13= | 1 | 1 | 0 | 1 |
| G14= | 1 | 1 | 0 | 0 |
| G15= | 1 | 1 | 1 | 1 |

Thus, there has been set forth the particular logical equations which are adequate to define an electronic digital computer. Although the preferred embodiment incorporates a magnetic drum memory for the storage of information, it is well within the scope of the invention to use any other serial memory device, or, alternatively, to use any other "addressable" memory device. All important information is stored within the memory and simple, logical gating means are time shared by many stored "words" to effect great savings in equipment.

It is also well within the skill of the art, in accordance with the teachings of the present invention, to re-examine the logical equations and generate a different set of equations which are logically equivalent to those set forth, and which, when embodied in hardware, would provide a different device to accomplish the same purposes. For example, a counter and gating matrix may be substituted for the "ring-counter" which functions as the phase counter. Still other modifications might exploit some of the other properties of a magnetic drum, such as relative precession, which would permit still other "hardware" embodiments of the present invention.

Thus, there has been shown a novel machine for tallying paper ballots which provides a scanning head for each column of the ballot and which assigns, in a serial memory, a pair of storage words corresponding to each possible voting location on the ballot. One of the serial memory words contains format and program information which identifies ballot locations which in a particular election corresponds to candidates for offices or issues to be voted upon, and still other information with respect to the number of votes permissible for each office or issue. The present invention also includes means for continually displaying the total number of ballots tallied.

Also in accordance with the present invention, a logical network is time shared by all of the serial memory words so that a single counting logic unit suffices to accumulate counts in each serial memory word representing a total of votes cast.

Also, a novel readout and display mechanism has been described in which a slider is provided with a position-to-code mechanism that provides a unique code signal combination to correspond to each location in which a voter may, by making a mark, indicate a preference. The present invention provides apparatus which, in response to the address generated by the slider, causes the serial memory to read out a binary number stored therein representing the total votes cast for the candidate or proposition, and converts this binary number to a binary-coded-decimal number which is then displayed by suitable display apparatus, without modifying the word stored within the memory.

What is claimed as new is:

1. A machine for tallying votes, said machine being operable in conjunction with a ballot having the votes expressed thereon as voter's marks in predetermined voting locations corresponding to selected alternatives, said machine comprising in combination:

vote signalling means operable in response to the sensing of each applied ballot to enable a serially scanning all of the voting locations thereon for signalling the presence and absence, respectively, of voter's marks in each such location;

storage means coupled to said vote signalling means and responsive to signals therefrom during the passage of each voting location to generate and store selectively in one of a plurality of first storage locations, respectively corresponding the voting location being scanned, a first signal representing the presence of a voting mark and a second signal representing the absence of a voting mark, alternatively;

said storage means including count storage means for continuously storing in a plurality of second locations, each respectively corresponding to a voting location, number signals representing an accumulated total of votes cast in each such voting location from previously applied ballots; and vote counting means coupled to said storage means and operable after the passage of each ballot and in response to storage means signals to generate and store in said count storage means new number signals representing the accumulated number of votes cast in each voting location, increased by any valid votes cast on the ballot just scanned.

2. In conjunction with election ballots in which a voter's preferences for alternative choices are expressed by the placing of marks representing votes in predetermined voting locations, in columnar array, each location corresponding to a different alternative, a machine adapted to tally the valid votes cast on such election ballots including in combination:

vote signalling means including scanning means for signalling the presence and absence of voter's marks and transport means for serially presenting all of said voting locations of each ballot to said scanning means;

storage means coupled to said vote signalling means and including staticizing means operable in response to scanning means signals for producing and storing first and second signals respectively corresponding to the presence and absence of a mark in a voting location of the ballot so scanned by said scanning means, buffer storage means for storing signals representing format information applicable to all ballots, and count storage means for storing signals in storage locations respectively corresponding to ballot voting locations representing accumulated totals of votes tallied from previously presented ballots; and vote counting means connected to said storage means and operable in response to signals stored therein for generating and storing in said count storage means new signals representing former totals of votes tallied from prior ballots as modified by the votes cast on the ballot just processed;

said combination being cyclically operable to read ballots, to store signals corresponding to votes cast thereon, and to update stored totals to include votes cast on the ballot just read.

3. A machine for tallying the votes cast by placing a mark on a ballot in a predetermined location for each candidate for an office, the locations for each of the candidates being in vertical columnar alignment, the machine comprising:

ballot transport means adapted to move ballots in a direction substantially parallel to the vertically aligned predetermined candidate locations;

scanning means positioned adjacent said ballot transport means and adapted to scan, sequentially, the column of aligned predetermined candidate locations;

mark detecting means in said scanning means for signalling the presence of a voter's mark in a predetermined candidate location;

ballot timing means for counting and signalling the count of each predetermined candidate locations;

a plurality of count storage means each corresponding to a different candidate location;

addressing means for identifying each of said plurality of count storage means; and vote storage means connected to said mark detecting means and said ballot timing means for storing a signal corresponding to each mark on the ballot so detected; and count updating means, coupled to said plurality of count storage means and said vote storage means for adding a unit count to said count storage means respectively corresponding to each predetermined candidate location having a mark therein.

4. In conjunction with election ballots in which a voter's preference for alternative choices are expressed by the placing of marks representing votes in predetermined voting locations in columnar array, each location corresponding to a different alternative, the ballot further including special timing indicia respectively corresponding to each location in a column, a machine adapted to tally the valid votes cast on such election ballots including in combination:

ballot transport means adapted for transporting the ballots through the machine in a direction substantially parallel to the columnar array;

location scanning means positioned adjacent said ballot transport means, aligned to be in operating relationship with the location columns, and operable in response to the contents of the locations for generating first and second signals, respectively corresponding to the presence and absence of marks opposite said scanning means;

indicia scanning means adjacent said ballot transport means in operating relationship with said indicia and operable to provide timing signals respectively corresponding to the presence of an index mark directly adjacent said indicia scanning means; and staticizing means coupled to said indicia scanning means and said location scanning means and operable in response to signals therefrom for generating and storing third and fourth signals, respectively corresponding to said first and second signals occurring simultaneously with said timing signals whereby voter's marks not entirely within a predetermined location are allocated to and identified with the predetermined location containing the major portion of the mark.

5. In conjunction with election ballots in which a voter's preferences for alternative choices are expressed by the placing of marks representing votes in predetermined voting locations in columnar array and arranged in sets, each voting location of a set corresponding to a different alternative choice for the set, a machine adapted to tally only those votes cast on such election ballots that are determined to be valid according to pre-arranged criteria, including in combination:

scanning means for serially scanning voting location columns and for producing first signals in response to the presence of a voter's mark therein;

ballot transport means adapted to continually transport applied ballots adjacent said scanning means for serially exposing all of the voting locations in a column to said scanning means;

memory means including a plurality of pairs of word storage elements each having a group of memory cells, each pair respectively corresponding to a different voting location in a ballot column, a first word storage element of each such pair being adapted to store signals having alternatively first and second values for designating the corresponding voting location as a valid voting location in validating cells, signals indicating the contents of such voting location in voting cells, and synchronizing signals having a first value in one word storage element of said plurality and a second value in all other word storage elements of said plurality in synchronizing cells, the second word storage element of each said pair being adapted to store a group of signals representing a number corresponding to the accumulated number of valid votes detected by said scanning means in all previously applied ballots;

said first word storage elements further including in each set corresponding to the alternative choices for the same office, signals in a predetermined number of word storage elements corresponding to the permitted number of alternative choices for each such office in permissible number cells; and addressing means coupled to said scanning means and said storage means and continuously operable in response to the passage of each voting location adjacent said scanning means for applying a signal representing the contents of said voting location to one of the pair of word storage elements corresponding thereto;

said machine being operable in a programming phase in response to applied specially marked programming sheets having a format substantially identical to that of the ballots, for storing in all of the first word storage elements, pre-arranged criteria including signals having values corresponding to the special marking on the programming sheets, in cells representing validating cells, and permissable number cells, and for filling said synchronizing cells.

6. A machine for tallying election ballots in which a voter's valid preferences for alternative choices are expressed by the placing of a prescribed number of marks representing votes in predetermined voting locations arranged in sets in columnar array, each location corresponding to a different alternative of a set, the machine comprising in combination:

first serial memory means for storing and serially presenting signals representing information stored therein, said first serial memory means including a first storage loop having a first plurality of groups of cells adapted to store signals representing ballot format and voting information including the number of allowable choices for each set, first writing means operable in response to applied signals for storing corresponding signals in said first loop, and first reading means for retrieving and presenting signals stored in said first loop, each of the voting locations having a one of said group respectively corresponding thereto and associated therewith;

second serial memory means operable in synchronism with said first serial memory means for storing and serially presenting signals representing information stored therein, said second serial memory means including a second storage loop having a first plurality of groups of cells, corresponding respectively to said first storage loop groups and the voting location associated therewith, and adapted to store signals representing accumulated totals, second writing means operable in response to applied signals for storing corresponding signals in said second loop, and second reading means for retrieving and representing signals stored in said second loop;

scanning means adapted for serially scanning all of the predetermined voting locations of a ballot and for providing signals representing the contents of each such voting location;

buffer storage means coupled to said scanning means and said first serial memory means for staticizing and applying to said first reading means signals corresponding to the contents of each voting location for storage in the group of cells associated therewith;

logical gating means coupled to said first writing means and said first reading means and operable in response to signals therefrom for generating and applying to said first writing means inhibit signals in each group of cells corresponding to a set of choices having more than the allowable number of alternatives selected and determined to be invalid; and updating means coupled to said first reading means, said second reading means and said second writing means and operable in response to applied signals for generating and applying to said second writing means new signals representing updated totals corresponding to the numbers formerly stored in said second serial memory, each incremented by signals representing a vote in the absence of an associated inhibit signal within the same group, whereby otherwise valid voter's marks within a set are subsequently determined to be invalid if more than a permitted number of alternative choices are selected within that set after a ballot has been scanned.

7. In conjunction with election ballots in which a voter's preferences for alternative choices are expressed by the placing of marks representing votes in predetermined voting locations in columnar array, each location corresponding to a different alternative, each ballot further being provided with a predetermined number of timing indicia having a predetermined relationship with voting locations, a machine adapted to tally the valid votes cast on such election ballots including in combination:

ballot reading means including ballot transport means, ballot scanning means adjacent said ballot transport means and adapted to detect and signal the presence of marks in the predetermined locations, staticizing means coupled to said scanning means for storing signals corresponding to the contents of the predetermined location immediately adjacent said scanning means, and ballot timing means adjacent said scanning means and operable in response to the presence of ballot indicia for counting the ballot indicia, signalling the relative columnar position of each predetermined location, and for applying control signals to said staticizing means for associating poorly placed marks with the proper location;

first serial memory means for storing and serially presenting signals stored therein, said serial memory means including a first storage loop having a plurality of groups of cells adapted to have signals representing format and vote information stored therein each of said groups respectively corresponding to a different voting location, first reading means for retrieving and presenting signals stored in said loop, and first writing means and normally responsive to signals therefrom for returning and recirculating information within said storage loop;

second serial memory means for storing and serially presenting signals stored therein, said second serial memory means including a second storage loop having a corresponding plurality of groups of cells having signals representing accumulated vote totals stored therein, each said group respectively corresponding to a different voting location and an associated first loop cell group, first reading means for retrieving and presenting signals stored in said second loop; and second writing means coupled to said second reading means and normally operable in response to signals therefrom for returning and recirculating information within said second storage loop;

memory addressing means for signalling a unique identification for the group of cells then in operable relationship with said reading and writing means;

gating means coupled to said first memory means, said ballot reading means, and said memory addressing means and operable in response to signals therefrom for applying to said first writing means for storage in the group of first storage cells corresponding to the voting location being scanned by said ballot reading means, signals corresponding to the contents thereof; and ballot validating means coupled to said ballot reading means and said first serial memory means for comparing the number of predetermined ballot indicia counted against the predetermined number, said ballot validating means being operable in response to inequalities in the comparison of said indicia count with the predetermined number for providing a signal representing a completely invalid ballot and for disregarding all of the voting information received therefrom, whereby ballots whose voting locations contents may not be accurately stored in said first memory means are wholly disregarded but can be re-applied to the machine.

8. In conjunction with election ballots in which a voter's preferences for alternative choices are expressed by the placing of marks representing votes in predetermined voting locations in columnar array, each location corresponding to a different alternative, a machine adapted to tally the valid votes cast on such election ballots including in combination:

ballot reading means including ballot transport means, ballot scanning means adjacent said ballot transport means and adapted to detect and signal the presence of marks in the predetermined locations, staticizing means coupled to said scanning means for storing signals corresponding to the contents of the predetermined location immediately adjacent said scanning means, and ballot timing means adjacent said scanning means and operable in response to predetermined ballot timing indicia for counting the ballot indicia and signalling the relative columnar position of each predetermined location and for applying control signals to staticizing means for associating poorly placed marks with the proper location;

first serial memory means for storing and serially presenting signals stored therein, said serial memory means including a first storage loop having a plurality of groups of cells adapted to have signals representing format and vote information stored therein, first reading means for retrieving and presenting signals stored in said loop, and first writing means and normally responsive to signals therefrom for returning and recirculating information within said storage loop;

second serial memory means for storing and serially presenting signals stored therein, said second serial memory means including a second storage loop having a corresponding plurality of loops of cells of signals representing accumulated vote totals stored therein, first reading means for retrieving and presenting signals stored in said second loop;

second writing means coupled to said second reading means and normally operable in response to signals therefrom for returning and recirculating information within said second loop;

each predetermined location of the ballot having a corresponding group of first storage loop cells and second storage loop cells associated therewith;

memory addressing means for signalling a unique identification for the group of cells then in operable relationship with said reading and writing means;

gating means coupled to said ballot reading means, and said memory addressing means and operable in response to signals therefrom for applying to said first writing means signals corresponding to the contents of the voting location being scanned by said ballot reading means for storage in the group of first storage loop cells associated therewith;

vote validating means coupled to said ballot reading means and said first serial memory means for comparing, for each set of alternative choices, the number of signals stored representing votes therefor as against a permissible number preselected earlier and stored in said first storage loop, said means being operable in response to comparison inequalities for generating and storing in said first storage loop signals for inhibiting the utilization of signals representing voter's marks determined by the comparison to be invalid;

count updating means coupled to said first and second reading means and said second writing means and operable in response to signals from said second reading means representing previous totals and signals from said first reading means representing current votes and inhibit signals, for applying to said second writing means signals representing updated vote totals corresponding to the old vote total increased by a new vote in the absence of an inhibit signal in the same cell group; and vote total display means, including position encoding means for generating a signal corresponding to a preselected location, visual display means for presenting the visual representation of signals representing a number, and display gating means, coupled to said position encoding means, said display means and said second memory means for applying to said display means the signals stored in the group of cells corresponding to the preselected location;

whereby accumulated vote totals for each voting location are displayed in visual form.

9. In conjunction with election ballots in which a voter's preferences for a given number alternative choices are expressed by the placing of marks representing votes in predetermined voting locations in columnar array, each voting location corresponding to a different alternative, a machine adapted to tally the valid votes cast on such election ballots including, in combination:

memory means including a plurality of first storage locations and a corresponding plurality of second storage locations associated therewith, each voting location corresponding to an associated first and second storage location of said plurality;

first means coupled to said memory means for scanning a ballot column and detecting the marks therein, and for generating and distributing first and second signals respectively representing the presence and absence of marks in voting locations into said first storage locations corresponding respectively, to each voting location so scanned;

second means coupled to said first means and operable in response to a predetermined program stored in said first storage location for generating and storing in said first storage locations third signals representing vote inhibiting instructions, in association with each stored signal representing an invalid vote; and logical gating means coupled to said memory means and operable in response to applied first, second, and third signals from said first storage locations and signals from said second storage locations for generating and storing in each of said second storage locations, in response to application of first signals in the absence of third signals concurrent therewith, output signals, representing updated accumulative vote totals, whereby all of the valid votes expressed on a ballot are accumulated in said second storage locations and votes determined to be invalid are disregarded.

10. A machine for tallying the votes cast by placing a mark on a ballot in a predetermined location for each candidate for an office, the locations for each of the candidates being in vertical columnar alignment, the machine comprising:

ballot transport means adapted to move ballots in a direction substantially parallel to the vertically aligned predetermined candidate locations;

scanning means positioned adjacent said ballot transport means and adapted to scan, sequentially, the column of aligned predetermined candidate locations;

mark detecting means in said scanning means for signalling the presence of a voter's mark in a predetermined candidate location;

ballot timing means for counting and signalling the count of each predetermined candidate locations;

a plurality of count storage means each corresponding to a different candidate location;

addressing means for identifying each of said plurality of count storage means; and vote storage means connected to said mark detecting means and said ballot timing means for storing a first signal corresponding to each mark on the ballot so detected;

programming means coupled to said vote storage means and operable in a first machine phase, in response to specially prepared records having a ballot format, for storing in said count storage means, second signals designating valid voting locations and third signals for determining the number of votes permissible for each office;

vote validating means, coupled to said plurality of count storage means and operable, in a second machine phase, in response to first, second and third signals for generating and applying to said vote storage means, fourth signals in association with each said first signal representing a valid vote; and count updating means, coupled to said plurality of count storage means and said vote storage means and operable in response to each associated pair of said first and fourth signals for adding a unit count to said count storage means respectively corresponding to each predetermined candidate location having a mark representing a valid vote therein.

11. In conjunction with election ballots in which a voter's preferences for alternative choices are expressed by the placing of marks representing votes in predetermined voting location, in columnar array, each location corresponding to a different alternative, a machine adapted to tally the valid votes cast on such election ballots including in combination:

vote signalling means including scanning means for signalling the presence and absence of voter's marks and transport means for serially presenting all of said voting locations of each ballot to said scanning means;

storage means coupled to said vote signalling means and including staticizing means operable in response to scanning means signals for producing and storing first and second signals respectively corresponding to the presence and absence of a mark in a voting location of the ballot so scanned by said scanning means, buffer storage means for storing signals representing format information applicable to all ballots, and count storage means for storing in storage locations respectively corresponding to ballot voting locations, number signals representing accumulated totals of votes tallied from previously presented ballots;

vote validating means coupled to said vote signalling means and said storage means and operable during a preliminary machine phase in response to applied records corresponding to ballots, for generating and storing in said buffer storage means format information signals designating valid voting locations and permissible multiple choices and operable during a subsequent major machine phase for generating and selectively storing in association with each said first signal, third and fourth signals alternatively representing valid and invalid votes; and vote counting means connected to said storage means and operable in response to first, third and signals stored therein for generating and storing in said count storage means, new number signals representing former totals of votes tallied from prior ballots as modified by the valid votes cast on the ballot just processed;

said combination being cyclically operable during a major machine phase, to read ballots, to store signals corresponding to votes cast thereon, and to update stored totals to include votes cast on the ballot just read.

12. In conjunction with election ballots in which a voter's preferences for alternative choices are expressed by the placing of marks representing votes in predetermined voting locations in columnar array, each location corresponding to a different alternative, a machine adapted to tally only those votes cast on such election ballots as are determined to be valid according to pre-arranged criteria including in combination;

means for scanning a voting location and for producing first signals in response to the presence of a voter's mark therein;

ballot transport means adapted for continuously transporting each ballot applied thereto adjacent said scanning means, and serially exposing all of the voting locations in the column to said scanning means;

timing means, including separate scanning means, positioned adjacent said ballot transport means, said timing means being operable in response to predetermined ballot indicia for continuously identifying the voting square of the column then being scanned by said scanning means contemporaneously therewith;

signal storage means connected to said scanning means and said timing means and operable in response to each combination of said first signal and the timing means signals coinciding therewith, for generating and storing a second signal in a storage location uniquely corresponding to the voting square then being scanned by said scanning means;

vote accumulating means including a plurality of means each respectively corresponding to a voting location, for storing third signals, each representing the total number of ballots containing voter's marks in the voting square corresponding thereto;

logical gating means connected to and operable in synchronism with said signal storage means and said vote accumulating means for generating new third signals in response to stored second and third signals and including means for applying said new third signals for storage in said accumulating means; and means coupled to said vote accumulating means for selectively copying third signals from a preselected one of said plurality of means, and including visual display means operable in response to copied third signals for providing an optical display of the decimal number corresponding thereto and representing the accumulated vote in the voting location respectively corresponding to the said preselected one of said plurality of means.

13. In conjunction with election ballots in which a voter's preference for alternative choices are expressed by the placing of marks representing votes in predetermined voting locations in columnar array, each location corresponding to a different alternative, the ballot further having indicia markings in columnar array, each respectively corresponding to each of the voting locations in a column, a machine adapted to tally the valid votes cast on such election ballots including in combination:

ballot transport means for moving applied ballots through the machine in a direction parallel to the columnar orientation;

vote detecting means including first scanning means positioned adjacent the path of travel of said voting locations and operable to detect and signal the presence of a voter's mark adjacent said first scanning means;

timing means including indicia scanning means positioned adjacent the path of indicia column travel and operable to detect and signal the presence of a marking adjacent said indicia scanning means, said timing means further including means for generating and signalling a predetermined unique code combination for identifying the voting location concurrently adjacent said first scanning means;

staticizing means coupled to said vote detecting means and said timing means for storing a signal representing the contents of the voting location adjacent said first scanning means at a time simultaneous with the provision of a signal from said indicia scanning means;

first memory means including a plurality of groups of cells, each group of cells respectively associated with a different voting location, said first memory means including first read means for serially presenting the contents of said first memory means, and first writing means coupled to said first reading means and normally operable to restore signals read from said first memory means;

second memory means having a corresponding plurality of groups of cells, each group of second memory means cells being associated with a corresponding group of first memory means cells and a corresponding one of the ballot voting locations, said second memory means including second reading means for serially presenting signals stored in said second memory means and second writing means coupled to said reading means and normally operable to restore signals read from said second memory means;

memory addressing means including counting means coupled to said first and second memory means for identifying groups of memory cells of said first and second memory means in operative relationship with said reading and writing means;

enabling means, coupled to said counting means, said staticizing means and said first memory means and operable in response to signals applied therefrom for entering signals representing voting preferences into said first memory cell groups respectively corresponding to the voting locations containing the voter's marks;

vote validating means coupled to said first memory means for comparing stored signals representing voter's preferences against predetermined format signals and for generating and storing an inhibit signal in said first memory means in preselected cells of each group associated with the voting locations comprising the alternative choices for which more than a predetermined number of votes have been cast;

updating means coupling said first and second memory means and operable in response to the presence of signals representing a voter's preference in each group of cells and the absence of an associated inhibit signal in the same group of cells generating and applying to said second memory means count signals representing a total number of voter's preferences for each alternative represented by the corresponding group of cells of said second memory means;

read-out means, including static storage means coupled to said second reading means for storing the contents of a predetermined one of said second memory groups of cells, and including encoding means for generating a code combination, representing the total number stored in said static storage means in a decimal code, and visual display means coupled to said encoding means and operable in response to signals therefrom for displaying in decimal numeral configuration, the number represented by the signals stored therein.

14. In conjunction with election ballots in which a voter's preference for alternative choices are expressed by the placing of voting marks representing votes in predetermined voting locations in columnar array, each location corresponding to a different alternative choice, the ballot further having indicia markings in columnar array respectively corresponding to each of the voting locations in a column, a machine adapted to tally the valid votes cast on such election ballot including in combination:

ballot transport means for moving applied ballots through the machine in a direction parallel to the columnar orientation;

vote detecting means including scanning means positioned adjacent the path of travel of said voting locations and operable to detect and signal the presence of a voter's mark adjacent said scanning means;

timing means including indicia scanning means positioned adjacent the path of indicia column travel and operable to detect and signal the presence of an indicium mark adjacent said indicia scanning means, said timing means further including means for generating and signalling predetermined unique code signal combinations for identifying each successive voting location of a ballot adjacent said vote scanning means;

staticizing means coupled to said vote detecting means and said timing means for storing a signal representing the contents of a voting location at a time determined by the provision of a signal from said indicia scanning means;

first cyclically operable serial memory means including a plurality of groups of cells, each group of cells respectively associated with a different voting location, said first memory means including first read means for serially presenting the contents of said first memory means, and first writing means for storing signals representing predetermined ballot format and voting information in said first memory means, said first writing means being normally operable to restore signals applied from said first reading means;

second serial means, cyclically operable in synchronism with said first serial memory means and having a corresponding plurality of groups of cells, each group of second memory means cells being associated with a corresponding group of first memory means cells and a corresponding one of the ballot voting locations, said second memory means including second reading means for serially presenting signals stored in said second memory means, and second writing means coupled to said reading means for storing signals representing numbers in said second memory means and being normally operable to restore signals applied from said second reading means;

memory addressing means including counting means coupled to said first and second memory means for identifying the associated groups of memory cells of said first and second memory means concurrently in operative relationship with said reading and writing means;

enabling means coupled to said counting means, said staticizing means and said first memory means and operable in response to applied signals therefrom for entering a signal representing the contents of the voting location then adjacent said scanning means into the said first memory cell group respectively corresponding to that voting location;

programming means coupled to said enabling means and operable during a programming phase of machine operation in response to applied prepared programming sheets substantially in ballot format, for storing predetermined format signals in preselected ones of said first memory means groups of cells corresponding to valid voting locations and an allowable number of choices for each office to be voted upon;

vote validating means coupled to said first memory means and operable during a vote tallying phase of machine operation for comparing stored signals representing voting marks, against said predetermined format signals and for generating and storing a first valued inhibit signal in said first memory means in preselected cells of each group associated with voting locations corresponding to the alternative choices for which more than a predetermined number of votes have been cast, and a second valued inhibit signal in each first means cell group storing a valid vote;

updating means coupling said first and second memory means and operable in response to the presence of signals representing a voting mark in each group of cells and an associated second valued inhibit signal in the same group of cells, for increasing by one the total count stored in the corresponding group of second memory means cells;

read-out means, including location selecting means, static storage means coupled to said second reading means and normally operative during vote tallying phases of machine operation for storing the contents of a predetermined one of said second memory cell groups containing signals representing the total number of ballots tallied, and including encoding means for generating a code combination to represent the number in a decimal code, and visual display means coupled to said encoding means and operable in response to signals therefrom for displaying in a decimal numeral configuration, the number represented by the signals stored therein, said read-out means being operable in a display phase of machine operation, in response to said location selecting means for storing the contents of the corresponding selected one of said second memory cell groups for displaying in visual decimal form the vote totals stored therein.

15. In conjunction with election ballots in which a voter's preferences for alternative choices are expressed by the placing of marks representing votes in predetermined voting locations in columnar array and arranged in sets, each voting location of a set corresponding to a different alternative choice for the set, a machine adapted to tally only those votes cast on such election ballots that are determined to be valid according to pre-arranged criteria, the ballots being further distinguished by the absence of a predetermined corner at the leading edge resulting from the removal therefrom by polling place inspectors, including in combination:

scanning means for serially scanning voting location columns and for producing first signals in response to the presence of a voter's mark therein;

ballot transport means adapted to continually transport applied ballots adjacent said scanning means for serially exposing all of the voting locations in a column to said scanning means;

memory means including a plurality of pairs of word storage elements each having a group of memory cells, each pair respectively corresponding to a different voting location in a ballot column, a first word storage element of each such pair being adapted to store signals having alternatively first and second values for designating the corresponding voting location as a valid voting location in validating cells, synchronizing signals having a first value in one word storage element of said plurality and a second value in all other word storage elements of said plurality in synchronizing cells, the second word storage element of each said pair being adapted to store a group of signals representing a number corresponding to the accumulated number of valid votes detected by said scanning means in all previously applied ballots;

said first word storage elements further including in each set corresponding to the alternative choices for the same office, signals in permissible number cells of a predetermined number of word storage elements corresponding to the permitted number of alternative choices for each such office;

addressing means coupled to said scanning means and said storage means and continuously operable in response to the passage of each voting location adjacent said scanning means for applying a signal representing the contents of said voting location to one of the pair of word storage elements corresponding thereto;

said machine being operable in a programming phase in response to applied specially marked programming sheets having a format substantially identical to that of the ballots, for storing in all of the first word storage elements, pre-arranged criteria including signals having values corresponding to the special markings on the programming sheets in cells representing validating cells and permissible number cells, and for filling said synchronizing cells, and switch means positioned to determine the absence of the predetermined corner of a ballot leading edge, including a first switch in the path of ballot travel and adapted to contact the portion from which corners are removed;

a second switch in path of ballot travel and adapted to contact the ballot leading edge at a different position said first and second switches adapted to operate in a first sequence for valid ballot properly fed; and error signalling means to detect the operating sequence of said switches and operable in response to all but said first sequence to signal error in feed resulting from invalid ballots or from a valid ballot improperly applied to said ballot transport means.

16. In conjunction with election ballots in which a voter's preferences for alternative choices are expressed by the placing of marks representing votes in predetermined voting locations in columnar array and arranged in sets, each voting location of a set corresponding to a different alternative choice for the set, a machine adapted to tally only those votes cast on such election ballots that are determined to be valid according to pre-arranged criteria, including in combination:

scanning means for serially scanning voting location columns and for producing first signals in response to the presence of a voter's mark therein;

ballot transport means adapted to continually transport applied ballots adjacent said scanning means for serially exposing all of the voting locations in a column to said scanning means;

memory means including a plurality of pairs of word storage elements each having a group of memory cells, each pair respectively corresponding to a different voting location in a ballot column, a first word storage element of each such pair being adapted to store signals having alternatively first and second values for designating the corresponding voting location as a valid voting location in validating cells, signals indicating the contents of such voting location in voting cells, and synchronizing signals having a first value in one word storage element of said plurality and a second value in all other word storage elements of said plurality in synchronizing cells, the second word storage element of each said pair being adapted to store a group of signals representing a number corresponding to the accumulated number of valid votes detected by said scanning means in all previously applied ballots;

said first word storage elements further including in each set corresponding to the alternative choices for the same office, signals in permissible number cells of a predetermined number of word storage elements corresponding to the permitted number of alternative choices for each such office; and addressing means coupled to said scanning means and said storage means and continuously operable in response to the passage of each voting location adjacent said scanning means for applying a signal representing the contents of said voting location to one of the pair of word storage elements corresponding thereto;

said machine being operable in a programming phase in response to a first applied specially marked programming sheet having a format substantially identical to that of the ballots, for storing in all of the first words, pre-arranged criteria including signals having values corresponding to the special markings of the programming sheet in cells representing validating cells, and in response to a second applied specially marked programming sheet for storing signals having values corresponding to the special markings of the second programming sheet in permissible number cells.

17. In conjunction with election ballots in which a voter's preferences for alternative choices are expressed by the placing of marks representing votes in predetermined voting locations in columnar array and arranged in sets, each voting location of a set corresponding to a different alternative choice for the set, a machine adapted to tally only those votes cast on such election ballots that are determined to be valid according to pre-arranged criteria, including in combination:

scanning means for serially scanning voting location columns and for producing first signals in response to the presence of a voter's mark therein;

ballot transport means adapted to continually transport applied ballots adjacent said scanning means for serially exposing all of the voting locations in a column to said scanning means;

memory means including a plurality of pairs of word storage elements each having a group of memory cells, each pair respectively corresponding to a different voting location in a ballot column, a first word storage element of each such pair being adapted to store signals having alternatively first and second values for designating the corresponding voting location as a valid voting location in validating cells, signals indicating the contents of such voting location in voting cells, synchronizing signals having a first value in one word storage element of said plurality and a second value in all other word storage elements of said plurality in synchronizing cells, the second word storage element of each said pair being adapted to store a group of signals representing a number corresponding to the accumulated number of valid votes detected by said scanning means in all previously applied ballots;

said first word storage elements further including in each set corresponding to the alternative choices for the same office, signals in a predetermined number of word storage elements corresponding to the permitted number of alternative choices for each such office in permissible number cells;

addressing means coupled to said scanning means and said storage means and continuously operable in response to the passage of each voting location adjacent said scanning means for applying a signal representing the contents of said voting location to one of the pair of word storage elements corresponding thereto;

said machine being operable in a programming phase in response to applied specially marked programming sheets having a format substantially identical to that of the ballots, for storing in all of the first word storage elements, pre-arranged criteria including signals having values corresponding to the special markings the programming sheets in cells representing validating cells and permissible number cells and for filling said synchronizing cells; and synchronizing means coupled to said memory means and said addressing means and operable in response to signals stored in synchronizing cells for generating and signalling a machine malfunction on the occurrence of a second valued signal in said one first word storage element or first valued signals in all other first word storage elements.

18. In conjunction with election ballots in which a voter's preferences for alternative choices are expressed by the placing of marks representing votes in predetermined voting locations in columnar array and arranged in sets, each voting location of a set corresponding to a different alternative choice for the set, a machine adapted to tally only those votes cast on such election ballots that are determined to be valid according to pre-arranged criteria, including in combination:

scanning means for serially scanning voting location columns and for producing first signal in response to the presence of a voter's mark therein;

ballot transport means adapted to continually transport applied ballots adjacent said scanning means for serially exposing all of the voting locations in a column to said scanning means;

memory means including a plurality of pairs of word storage elements each having a group of memory cells, each pair respectively corresponding to a different voting location in a ballot column, a first word storage element of each such pair being adapted to store signals having alternatively first and second values for designating the corresponding voting location as a valid voting location in validating cells, signals indicating the contents of such voting location in voting cells, and synchronizing signals having a first value in one word storage element of said plurality and a second value in all other word storage elements of said plurality in synchronizing cells, the second word storage element of each said pair being adapted to store a group of signals representing a number corresponding to the accumulated number of valid votes detected by said scanning means in all previously applied ballots;

said first word storage elements further including in each set corresponding to the alternative choices for the same office, signals in permissible number cells of a predetermined number of word storage elements corresponding to the permitted number of alternative choices for each such office;

addressing means coupled to said scanning means and said storage means and continuously operable in response to the passage of each voting location adjacent said scanning means for applying a signal representing the contents of said voting location to one of the pair of word storage elements corresponding thereto;

said machine being operable in a programming phase in response to applied specially marked programming sheets having a format substantially identical to that of the ballots, for storing in all of the first word storage elements, pre-arranged criteria including signals having values corresponding to the special markings on the programming sheets in cells representing validating cells and permissible number cells, and for filling said synchronizing cells; and error detecting means, coupled to said scanning means, and operable during the programming phase in response to a predetermined combination of marks in a plurality of simultaneously scanned voting squares for signalling correct machine operation and for signalling a machine malfunction for all other combinations of marks.

19. In conjunction with election ballots in which a voter's preference for alternative choices are expressed by the placing of marks representing votes in predetermined voting locations in columnar array, each location corresponding to a different alternative, the ballot further having indicia markings in columnar array respectively corresponding to each of the voting locations in a column, a machine adapted to tally the valid votes cast on such election ballot including in combination:

ballot transport means for moving applied ballots through the machine in a direction parallel to the columnar orientation;

vote detecting means including scanning means positioned adjacent the path of travel of said voting locations and operable to detect and signal the presence of a voter's mark adjacent said scanning means;

timing means including indicia scanning means positioned adjacent the path of indicia column travel and operable to detect and signal an indicia mark adjacent said indicia scanning means, said timing means further including code means for generating and signalling a predetermined unique code combination for identifying the voting location concurrently adjacent said vote scanning means;

staticizing means coupled to said vote detecting means and said timing means for storing a signal representing the contents of a voting location coincident with the provision of a signal from said indicia scanning means;

first serial memory means including a plurality of groups of cells, each group of cells respectively associated with a different voting location, said first memory means including first read means for serially presenting the contents of said first memory means, and first writing means coupled to said first reading means and normally operable to restore signals read from said first memory means;

second memory means having a corresponding plurality of groups of cells each group of second memory means cells being associated with a corresponding group of first memory means cells and a corresponding one of the ballot voting locations, said second memory means including second reading means for serially presenting signals stored in said second memory means and second writing means coupled to said reading means and normally operable to restore signals read from said memory;

memory addressing means including counting means coupled to said first and second memory means for identifying groups of memory cells of said first and second memory means;

enabling means coupled to said counting means, said staticizing means and said first memory means and operable in response to applied signals for entering signals representing voting marks into the said first memory cell group respectively corresponding to the voting location containing the voter's mark;

vote validating means coupled to said first memory means for comparing stored signals representing voting marks against previously stored predetermined format signals and for generating and storing a first valued inhibit signal in said first means in preselected cells of each group associated with voting locations corresponding to the alternative choices for which more than a predetermined number of votes have been cast;

updating means coupling said first and second memory means and operable in response to the presence of signals representing a voting mark in each group of cells and an associated second valued inhibit mark in the same group of cells, for increasing by one the total count stored in the corresponding group of second memory means cells;

read-out means, including sliding position-to-digital converting means for providing a unique code signal combination corresponding to each voting location, gating means coupled to said timing means for presetting a unique code combination into said code means corresponding to a selected voting location, static storage means coupled to said second reading means for storing the contents of a predetermined one of said second memory cell groups, means coupled to said memory addressing means and said timing means for applying the content of a second memory cell group corresponding to the selected location to said static storage means and including means for generating a code combination representing the number stored in said static storage means in a decimal code and visual display means coupled to said means and operable in response to signals therefrom for displaying in decimal numeral configuration, the number represented by the signals stored therein.

20. In conjunction with election ballots in which a voter's preference for alternative choices are expressed by the placing of marks representing votes in predetermined voting locations in columnar array, each location corresponding to a different alternative, the ballot further having indicia markings in columnar array respectively corresponding to each of the voting locations in a column, a machine adapted to tally the valid votes cast on such election ballot including in combination:

ballot transport means for moving applied ballots through the machine in a direction parallel to the columnar orientation;

vote detecting means including scanning means positioned adjacent the path of travel of said voting locations and operable to detect and signal the presence of a voter's mark adjacent said scannig means;

timing means including indicia scanning means positioned adjacent the path of indicia column travel and operable to detect a signal indicia mark adjacent said indicia scanning means, said timing means further including means for generating and signalling a predetermined unique code combination for identifying the voting location concurrently adjacent said vote scanning means;

staticizing means coupled to said vote detecting means and said timing means for storing a signal representing the contents of a voting location at a time simultaneous with the provision of a signal from said indicia scanning means;

first serial memory means including a plurality of groups of cells, each group of cells respectively associated with a different voting location, said first memory means including first read means for serially presenting the contents of said first memory means, and first writing means for storing signals in said first memory means;

second memory means having a corresponding plurality of groups of cells each group of second memory means cells being associated with a corresponding group of first memory means cells and a corresponding one of the ballot voting locations, said second memory means including second reading means for serially presenting signals stored in said second memory means and second writing means coupled to said reading means and normally operable to restore signals read from said memory;

memory addressing means including counting means coupled to said first and second memory means for identifying groups of memory cells of said first and second memory means;

enabling means coupled to said counting means, said staticizing means and said first memory means and operable in response to applied signals for entering signals representing voting marks into said first memory cell group respectively corresponding to the voting location containing the voter's mark;

vote validating means coupled to said first memory means for comparing stored signals representing voting marks against previously stored predetermined format signals and for generating and storing an inhibit signal in said first means in preselected cells of each group associated with voting locations corresponding to the alternative choices for which more than a predetermined number of votes have been cast;

updating means coupling said first and second memory means and operable in response to the presence of signals representing a voting mark in each group of cells and the absence of an associated inhibit mark in the same group of cells for increasing by one the total count stored in the corresponding group of second memory means cells;

read-out means, including static storage means coupled to said second reading means for storing the contents of a predetermined one of said second memory cell groups, and including means for generating a code combination representing the number stored in said static storage means in a decimal code and visual display means coupled to said means and operable in response to signals therefrom for displaying in decimal numeral configuration, the number represented by the signals stored therein;

phase determining means including a different plurality of alternatively energizable static storage elements each having an energized and de-energized state, each said element in its energized state respectively directing to a different operational phase of said machine, said machine being responsive to the energized one of said storage elements to operate in the respectively, corresponding operational phase, and switching means, including manually operable selector controls for selectively energizing predetermined ones of said storage elements.

21. In conjunction with election ballots in which a voter's preferences for alternative choices for offices are expressed by the placing of marks representing votes in predetermined voting locations in columnar array, each location corresponding to a different alternative, a machine adapted to tally only those votes cast on such election ballots as are determined to be valid according to prearranged criteria including in combination;

scanning means for scanning a voting location and for producing first signals in response to the presence of a voter's mark therein;

ballot transport means adapted for continuously transporting each ballot applied thereto adjacent said scanning means, and serially exposing all of the voting locations in the column to said scanning means;

timing means, including separate scanning means, positioned adjacent said ballot transport means, said timing means being operable in response to predetermined ballot indicia for continuously identifying the voting square of the column then being scanned by said scanning means contemporaneously therewith;

signal storage means connected to said scanning means and said timing means and operable in response to each combination of said first signal and the timing means signals coinciding therewith, for generating and storing a second signal in a storage location uniquely corresponding to the voting square then being scanned by said scanning means;

vote accumulating means including a plurality of means each respectively corresponding to a voting location, for storing third signals, each representing the total number of ballots containing voter's marks in the voting square corresponding thereto and including means for storing signals representing the total number of valid ballots applied to said machine;

vote validating means coupled to said signal storage means and operable during a programming phase of said machine, in response to the sensing of prepared programming sheets, for generating and storing signals representing a valid voting location in each storage location so designated and for storing, in each group of locations corresponding to the alternatives for each office, signals representing the number of choices permitted for each such office;

vote inhibiting means coupled to said signal storage means and operable, during a tallying phase of said machine, after the passage of each ballot, in response to applied second signals and stored signals for generating and storing in said signal storage means, fourth signals in association with each second signal from an invalid voting location and each second signal in a group having more than the permitted number of second signals representing choices;

logical gating means coupled to and operable in synchronism with said signal storage means and said vote accumulating means for generating new third signals in response to applied stored second signals and third signals without associated fourth signals and including means for applying said new third signals for storage in said vote accumulating means; and means coupled to said vote accumulating means for selectively copying third signals from the preselected one of said plurality of means storing the number of applied ballots, and including visual display means operable in response to copied third signals for providing an optical display of the decimal number equivalent to the number of ballots tallied.

22. In conjunction with election ballots in which a voter's preferences for a given number of alternative choices are expressed by the placing of marks representing votes in predetermined voting locations in columnar array, each voting location corresponding to a different alternative, a machine adapted to tally the valid votes cast on such election ballots including, in combination:

memory means including a plurality of first storage locations and a corresponding plurality of second storage locations associated therewith, each voting location corresponding to an associated first and second storage location of said plurality;

first means coupled to said memory means and responsive to applied ballots for scanning a ballot column and detecting the marks therein, and for generating and distributing first and second signals respectively representing the presence and absence of marks in voting locations into said first storage locations corresponding respectively to each voting location so scanned;

programming means coupled to said first means and said memory means and operable during a preliminary machine phase, in response to applied programming sheets substantially identical to an election ballot and having marks thereon designating valid voting locations and the given number of alternatives permitted for each office, for generating and storing in said memory means, predetermined program signals;

second means coupled to said first means and operable during a major machine phase in response to said predetermined program signals stored in said first storage location for generating and storing in said first storage locations, third signals representing vote inhibiting instructions, in association with each stored first signal representing a vote determined to be invalid; and logical gating means coupled to said memory means and operable in response to applied first, second, and third signals from said first storage locations and signals from said second storage locations for generating and storing in each of said second storage locations, in response to application of first signals in the absence of third signals concurrent therewith, output signals representing updated accumulative vote totals whereby during a major machine phase all of the valid votes expressed on each ballot are distributed to the corresponding second storage locations and votes determined to be invalid are disregarded, and whereby valid votes on a plurality of applied ballots are accumulated in second storage locations and stored in each as a number represented by said output signals.

23. In conjunction with election ballots in which a voter's preferences for alternative choices are expressed by the placing of marks representing votes in predetermined voting locations in columnar array, each location corresponding to a different alternative, a machine adapted to tally only those votes cast on such election ballots as are determined to be valid according to pre-arranged criteria including in combination:

means for scanning a voting location and for producing first signals in response to the presence of a voter's mark therein;

ballot transport means adapted for continuously transporting each ballot applied thereto adjacent said scanning means, and serially exposing all of the voting locations in the column to said scanning means;

timing means, including separate scanning means, positioned adjacent said ballot transport means, said timing means being operable in response to predetermined ballot indicia for continuously identifying the voting square of the column then being scanned by said scanning means contemporaneously therewith;

signal storage means connected to said scanning means and said timing means and operable in response to each combination of said first signal and the timing means signals coinciding therewith, for generating and storing a second signal in a storage location uniquely corresponding to the voting square then being scanned by said scanning means;

vote accumulating means including a plurality of means each respectively corresponding to a voting location, for storing third signals, each representing the total number of ballots containing voter's marks in the voting square corresponding thereto;

logical gating means connected to and operable in synchronism with said signal storage means and said vote accumulating means for generating new third signals in response to stored second and third signals and including means for applying said new third signals for storage in said accumulating means;

read-out means coupled to said vote accumulating means for selectively copying third signals from a preselected one of said plurality of means, and including visual display means operable in response to copied third signals for providing an optical display of the decimal number corresponding thereto and representing the accumulated vote in the voting location respectively corresponding to the said preselected one of said plurality of means; and binary-to-decimal code converting means coupled to said read-out means and including first static register means for storing signals representing numbers in the binary number system, said first register means being adapted to store third signals from said preselected one of said means;

second static register means for storing signals representing numbers in the binary coded decimal;

said second static register means including zeroing means;

means for applying counting signals simultaneously to said first and second means to incrementally decrease the number stored in said first register means and increase the number stored in said second register means;

means for blocking provision of said counting signals to said static register means in response to the zero representing state of said first register and visual display means, connected to said second static register for providing a decimal display of the binary coded decimal number stored therein corresponding to the number represented by third signals applied to said first register means.

No references cited.

MALCOLM A. MORRISON, *Primary Examiner.*

DARYL W. COOK, *Examiner.*